(12) United States Patent
Kramer et al.

(10) Patent No.: US 7,853,945 B2
(45) Date of Patent: Dec. 14, 2010

(54) INTEGRATED COMPUTER SERVER IMAGING

(76) Inventors: Michael Kramer, 29 Fanshaw Ave., Yonkers, NY (US) 10705; Brendan Power, 3217 NE. 86th St., Seattle, WA (US) 98115; Eric B. Watson, 17422 NE. 28th St., Redmond, WA (US) 98052; Lee Linden, 12224 NE. 8th St., Apt. 208, Bellevue, WA (US) 98005

( * ) Notice: Subject to any disclaimer, the term of this patent is extended or adjusted under 35 U.S.C. 154(b) by 977 days.

(21) Appl. No.: 11/360,233

(22) Filed: Feb. 22, 2006

(65) Prior Publication Data

US 2007/0234346 A1    Oct. 4, 2007

(51) Int. Cl.
*G06F 9/445* (2006.01)
(52) U.S. Cl. .................. 717/174; 717/177; 709/203; 709/220
(58) Field of Classification Search ......... 717/120–121, 717/169–178; 709/220, 224, 245–252, 203
See application file for complete search history.

(56) References Cited

U.S. PATENT DOCUMENTS

| | | | |
|---|---|---|---|
| 5,005,122 A | | 4/1991 | Griffin et al. |
| 5,204,897 A | | 4/1993 | Wyman |
| 5,394,547 A | * | 2/1995 | Correnti et al. ............. 717/175 |
| 5,623,532 A | | 4/1997 | Houde et al. |
| 5,758,069 A | | 5/1998 | Olsen |
| 5,794,052 A | | 8/1998 | Harding |
| 5,845,065 A | | 12/1998 | Conte et al. |
| 5,883,955 A | | 3/1999 | Ronning |
| 5,933,646 A | | 8/1999 | Hendrickson et al. |
| 5,996,086 A | | 11/1999 | Delaney et al. |
| 6,051,032 A | | 4/2000 | Harrison et al. |
| 6,066,182 A | * | 5/2000 | Wilde et al. .................. 717/175 |
| 6,098,097 A | | 8/2000 | Dean et al. |
| 6,202,206 B1 | | 3/2001 | Dean et al. |
| 6,347,397 B1 | | 2/2002 | Curtis |
| 6,385,766 B1 | | 5/2002 | Doran, Jr. et al. |
| 6,453,413 B1 | | 9/2002 | Chen et al. |

(Continued)

FOREIGN PATENT DOCUMENTS

| | | |
|---|---|---|
| EP | 1 077 398 | 2/2001 |
| KR | 2004-88621 | 10/2004 |
| WO | WO 98/49620 | 11/1998 |
| WO | WO 2005/004388 | 1/2005 |
| WO | WO 2005/117362 | 12/2005 |

OTHER PUBLICATIONS

Microsoft Corporation, Microsoft MWS2K, Remote Operating System Installation, Sep. 1999, (Total Pages 45).*

(Continued)

*Primary Examiner*—Wei Y Zhen
*Assistant Examiner*—Hiren Patel
(74) *Attorney, Agent, or Firm*—Merchant & Gould, P.C.

(57) ABSTRACT

Computer server installation images can be created by installing and configuring software, such as an operating system and an application, on a computer server with deployment neutral settings and then imaging the server. A plurality of computer servers can be installed using a plurality of computer server installation images. A first server can be installed with a first image, and software installed from the image can be configured with deployment specific settings. A second server can be installed with a second image, and software installed from the image can be configured with deployment specific settings.

16 Claims, 24 Drawing Sheets

U.S. PATENT DOCUMENTS

| | | |
|---|---|---|
| 6,510,466 B1 | 1/2003 | Cox et al. |
| 6,529,784 B1 | 3/2003 | Cantos et al. |
| 6,698,018 B1 | 2/2004 | Zimniewicz et al. |
| 6,718,546 B1* | 4/2004 | Johnson ..................... 717/169 |
| 6,740,803 B2 | 5/2004 | Brinkman et al. |
| 6,804,774 B1 | 10/2004 | Larvoire et al. |
| 6,865,737 B1 | 3/2005 | Lucas et al. |
| 6,934,956 B1 | 8/2005 | Allen |
| 6,970,183 B1 | 11/2005 | Monroe |
| 6,981,262 B1 | 12/2005 | DeMello et al. |
| 7,383,327 B1 | 6/2008 | Tormasov et al. |
| 7,401,114 B1 | 7/2008 | Block et al. |
| 7,506,337 B2* | 3/2009 | Iyer ........................... 717/177 |
| 7,546,595 B1 | 6/2009 | Wickham et al. |
| 7,596,615 B2* | 9/2009 | Satkunanathan et al. .... 709/224 |
| 7,668,938 B1* | 2/2010 | Phillips et al. .............. 709/220 |
| 2002/0002704 A1 | 1/2002 | Davis et al. |
| 2002/0026478 A1 | 2/2002 | Rodgers et al. |
| 2002/0032763 A1 | 3/2002 | Cox et al. |
| 2002/0103931 A1 | 8/2002 | Mott |
| 2002/0104080 A1 | 8/2002 | Woodard et al. |
| 2002/0107750 A1 | 8/2002 | Kanevsky et al. |
| 2002/0133814 A1* | 9/2002 | Bourke-Dunphy et al. .. 717/174 |
| 2002/0138441 A1 | 9/2002 | Lopatic |
| 2002/0154157 A1 | 10/2002 | Sherr et al. |
| 2002/0156877 A1* | 10/2002 | Lu et al. ..................... 709/221 |
| 2003/0023564 A1 | 1/2003 | Padhye et al. |
| 2003/0036886 A1 | 2/2003 | Stone |
| 2003/0041136 A1 | 2/2003 | Cheline et al. |
| 2003/0084193 A1* | 5/2003 | Brake et al. ................. 709/250 |
| 2003/0126202 A1* | 7/2003 | Watt ........................... 709/203 |
| 2003/0177206 A1* | 9/2003 | Whitlow ..................... 709/220 |
| 2003/0191946 A1 | 10/2003 | Auer et al. |
| 2003/0217193 A1 | 11/2003 | Thurston et al. |
| 2003/0233431 A1 | 12/2003 | Reddy et al. |
| 2004/0024688 A1 | 2/2004 | Bi et al. |
| 2004/0044694 A1 | 3/2004 | Henig et al. |
| 2004/0060035 A1 | 3/2004 | Ustaris |
| 2004/0088698 A1 | 5/2004 | Claiborne |
| 2004/0090912 A1 | 5/2004 | Loo |
| 2004/0193388 A1* | 9/2004 | Outhred et al. ................. 703/1 |
| 2004/0193546 A1 | 9/2004 | Tokutani et al. |
| 2004/0199609 A1 | 10/2004 | Papatia et al. |
| 2004/0210649 A1 | 10/2004 | Bhogal et al. |
| 2004/0220894 A1 | 11/2004 | Soluk et al. |
| 2004/0243997 A1 | 12/2004 | Mullen et al. |
| 2004/0255135 A1 | 12/2004 | Kitaya et al. |
| 2004/0268345 A1* | 12/2004 | Lodwick et al. ............. 717/176 |
| 2005/0021477 A1 | 1/2005 | Krishnan et al. |
| 2005/0050174 A1 | 3/2005 | Kung |
| 2005/0066324 A1 | 3/2005 | Delgado et al. |
| 2005/0086457 A1 | 4/2005 | Hohman |
| 2005/0091164 A1 | 4/2005 | Varble |
| 2005/0091348 A1 | 4/2005 | Ferri et al. |
| 2005/0097547 A1 | 5/2005 | Ramachandran et al. |
| 2005/0105529 A1 | 5/2005 | Arberg et al. |
| 2005/0114412 A1 | 5/2005 | Gerhard |
| 2005/0114492 A1 | 5/2005 | Arberg et al. |
| 2005/0125550 A1 | 6/2005 | Bajikar |
| 2005/0131831 A1 | 6/2005 | Fieldson |
| 2005/0160420 A1* | 7/2005 | Kruta et al. .................. 717/174 |
| 2005/0163062 A1 | 7/2005 | Salesky et al. |
| 2005/0185607 A1 | 8/2005 | Svensson et al. |
| 2005/0187879 A1 | 8/2005 | Zigmond et al. |
| 2005/0188228 A1 | 8/2005 | DeMello et al. |
| 2005/0235281 A1 | 10/2005 | Lefrancois |
| 2005/0240815 A1 | 10/2005 | Purkeypile et al. |
| 2005/0240917 A1 | 10/2005 | Wu |
| 2005/0256958 A1 | 11/2005 | Wilson |
| 2005/0262232 A1 | 11/2005 | Cuervo et al. |
| 2005/0262502 A1 | 11/2005 | Lari et al. |
| 2005/0262503 A1* | 11/2005 | Kane ........................... 717/176 |
| 2005/0270989 A1 | 12/2005 | Park et al. |
| 2005/0278259 A1 | 12/2005 | Gunaseelan et al. |
| 2006/0031833 A1 | 2/2006 | Huang et al. |
| 2006/0047798 A1 | 3/2006 | Feinleib et al. |
| 2006/0064474 A1 | 3/2006 | Feinleib et al. |
| 2006/0075001 A1 | 4/2006 | Canning et al. |
| 2006/0123414 A1* | 6/2006 | Fors et al. .................... 717/177 |
| 2006/0155833 A1 | 7/2006 | Matsuda et al. |
| 2006/0156315 A1 | 7/2006 | Wood et al. |
| 2006/0253851 A1 | 11/2006 | Cho et al. |
| 2006/0282360 A1 | 12/2006 | Kahn et al. |
| 2007/0055715 A1 | 3/2007 | Achiwa |
| 2007/0143454 A1 | 6/2007 | Ma et al. |
| 2007/0234345 A1 | 10/2007 | Kramer et al. |
| 2007/0276905 A1 | 11/2007 | Durand et al. |
| 2008/0031238 A1 | 2/2008 | Harmelin et al. |
| 2008/0215468 A1 | 9/2008 | Monsa-Chermon et al. |
| 2008/0222275 A1 | 9/2008 | Yumoto |

OTHER PUBLICATIONS

Microsoft TechNet, Microsoft Migrator, Step-by-Step Guide to Migrating Files and Settings, Jun. 1, 2001, (pp. 10).*
Microsoft TechNet, Microsoft TCPIP, TCP/IP Core Networking Service, Jan. 21, 2005, (pp. 1).*
Microsoft TechNet, Microsoft SMTP, Simple Mail Transfer Protocol Service, Jan. 21, 2005, (pp. 1).*
Microsoft TechNet, Microsoft Firewall, Deploying Windows Firewall Settings, Dec. 17, 2004, (pp. 7).*
Microsoft TechNet, Microsoft RIP, Creating an installation image with RIPrep, Jan. 21, 2005, (pp. 4).*
International Search Report and Written Opinion, PCT/US2007/001552, 8 pages, May 23, 2007.
Hewlett-Packard Development Company, "HP Integrity Essentials Total Integrity Server Management," <http://h71028.www7.hp.com/enterprise/cache/4226-0-0-0-121.aspx>, 4 pages (accessed Jan. 4, 2006).
Bookpool.com, "Configuring Citrix MetaFrame XP for Windows, Including Feature Release 1," <http://www.bookpool.com/.x/RRRRRR/sm/1931836531>, 14 pages (accessed Jan. 4, 2006).
Microsoft Corporation, "Windows 2000 Back Officer Server: Product Overview," <http://www.thecomputerstore.be/windows_Back.htm>, 4 pages (accessed Jan. 4, 2006).
Microsoft Corporation, "Windows Small Business Server 2003: Frequently Asked Questions," <http://www.microsoft.com/windowsserver2003/sbs/techinfo/overview/generalfaq.mspx>, 20 pages (accessed Jan. 30, 2006).
Microsoft Corporation, "Windows Small Business Server 2003 Big Breakthroughs for Small Businesses," <http://rad.microsoft.com/ADSAdClient31.dll?GetAd=&PG=CMSSB1&SC=F3&AP=1164>, 35 pages (accessed Jan. 30, 2006).
Hewlett-Packard Development Company, "Instructions for installing Microsoft Windows Small Business Server 2003 with Service Pack 1 on HP ProLiant and tc servers," <http://h20000.www2.hp.com/bc/docs/support/SupportManual/c00208458/c00208458.pdf>, 12 pages (accessed Jan. 30, 2006).
Hewlett-Packard Development Company, "HP Raises the Bar for UNIX Workload Management," <http://www.hp.com/products1/unix/operating/docs/hp.raises.bar.wkld.mgmt.pdf>, 19 pages (Apr. 2002).
Hall, "An Architecture for Post-Development Configuration Management in a Wide-Area Network," <http://ieeexplore.ieee.org/search/wrapper.jsp?arnumber=598050>, 10 pages (1997).
Poynor, "Software Deployment on Network Storage Based Systems," <http://www.hpl.hp.com/techreports/2001/HPL-2001-257.pdf>, 8 pages (2001).
Lestideau, "Towards Automated Software Component Configuration and Deployment," <http://www-adele.imag.fr/Les.Publications/intConferences/PDTSD2002Les.pdf>, 6 pages (2002).
Network Computing, "Maximizing Uptime With Redundant DHCP," <http://www.networkcomputing.com/1119/1119ws2.html>, 5 pages (accessed Jan. 6, 2006).

MVI Solutions, "Full Redundancy Hosting, A Superior Solution," <http://www.mediavue.net/webHosting/full_redundancy_hosting.html>, 3 pages (accessed Jan. 6, 2006).

Lucent Technologies, "Implementing DHCP Redundancy to Sustain Critical Operations," <http://www.lucent.com/livelink/0900940380081b97_White_paper.pdf>, 5 pages (Nov. 2004).

Barlow, "Trust Negotiation in Electronic Markets," <http://isrl.cs.byu.edu/pubs/rseem2001.pdf>, 13 pages (2001).

Geer, "Digital Rights Technology Sparks Interoperability Concerns," <http://ieeexplore.ieee.org/ie15/2/30050/01377038.pdf?arnumber=1377038>, 3 pages (Dec. 2004).

IBM WebSphere Application Server V5.1 System Management and Configuration, IBM Redbook, Apr. 2004 [Websphere.pdf], Cited Sections 33-34, 61-62, 78, 141, 147-148, 154-156, 171-172, 176-179, 217-219, 222-225, 239, 279-282, 284-285, 466.

International Search Report and Written Opinion, PCT/US2007/001323, 9 pages, May 22, 2007.

International Search Report and Written Opinion, PCT/US2007/001551, 8 pages, Jul. 3, 2007.

Mana, "EC-Gate: An Infrastructure for DRM," <http://www.lcc.uma.es/~yague/440-808.pdf>, 6 pages (2003).

Microsoft Corporation, Microsoft TechNet, "E-Mail Services," 1 page, Jan. 21, 2005.

Sirbu, "NetBill: An Internet Commerce System Optimized for Network Delivered Services," http://ieeexplore.ieee.org/serach/wrapper.jsp?arnumber=512358>, 6 pages (1995).

U.S. Office Action cited in U.S. Appl. No. 11/360,213, mailed Jul. 16, 2009, 18 pages.

Amendment and Response to Office Action mailed Jul. 16, 2009, cited in U.S. Appl. No. 11/360,213, filed Oct. 19, 2009, 12 pages.

U.S. Office Action cited in U.S. Appl. No. 11/360,213, mailed Jan. 21, 2010, 13 pages.

Amendment and Response to Office Action mailed Jan. 21 2010, cited in U.S. Appl. No. 11/360,213, filed Apr. 21, 2010, 10 pages.

U.S. Office Action cited in U.S. Appl. No. 11/360,858, mailed Nov. 19, 2008, 14 pages.

Amendment and Response to Office Action cited in U.S. Appl. No. 11/360,858, filed Dec. 16, 2008, 13 pages.

U.S. Office Action cited in U.S. Appl. No. 11/360,858, mailed Apr. 1 2009, 14 pages.

Amendment and Response to Office Action mailed Apr. 1, 2009, cited in U.S. Appl. No. 11/360,858, filed May 29, 2009, 11 pages.

Notice of Allowance mailed Jul. 20, 2009, cited in U.S. Appl. No. 11/360,858, 4 pages.

U.S. Restriction Requirement cited in U.S. Appl. No. 11/360,275, mailed Aug. 31, 2009, 7 pages.

Amendment and Response to Restriction Requirement mailed Aug. 31, 2009, cited in U.S. Appl. No. 11/360,275, filed Sep. 15, 2009, 7 pages.

U.S. Office Action mailed Dec. 8, 2009, cited in U.S. Appl. No. 11/360,275, 14 pages.

Amendment and Response to Office Action mailed Dec. 8, 2009, cited in U.S. Appl. No. 11/360,275, filed Apr. 7, 2010, 13 pages.

U.S. Office Action mailed Jul. 9, 2010, cited in U.S. Appl. No. 11/360,275, 16 pages.

U.S. Restriction Requirement mailed Feb. 18, 2009, cited in U.S. Appl. No. 11/360,222, 6 pages.

Amendment and Response to Restriction Requirement mailed Feb. 18, 2009, cited in U.S. Appl. No. 11/360,222, filed Mar. 20, 2009, 7 pages.

U.S. Restriction Requirement mailed Jun. 1, 2009, cited in U.S. Appl. No. 11/360,222, 7 pages.

Amendment and Response to Restriction Requirement mailed Jun. 1, 2009, cited in U.S. Appl. No. 11/360,222, filed Jun. 25, 2009, 7 pages.

U.S. Office Action mailed Sep. 9, 2009, cited in U.S. Appl. No. 11/360,222, 12 pages.

Amendment and Response to Office Action mailed Sep. 9, 2009, cited in U.S. Appl. No. 11/360,222, filed Dec. 9, 2009, 14 pages.

U.S. Office Action mailed Mar. 2, 2010, cited in U.S. Appl. No. 11/360,222, 13 pages.

Amendment and Response to Office Action mailed Mar. 2, 2010, cited in U.S. Appl. No. 11/360,222, filed Jun. 4, 2010, 13 pages.

* cited by examiner

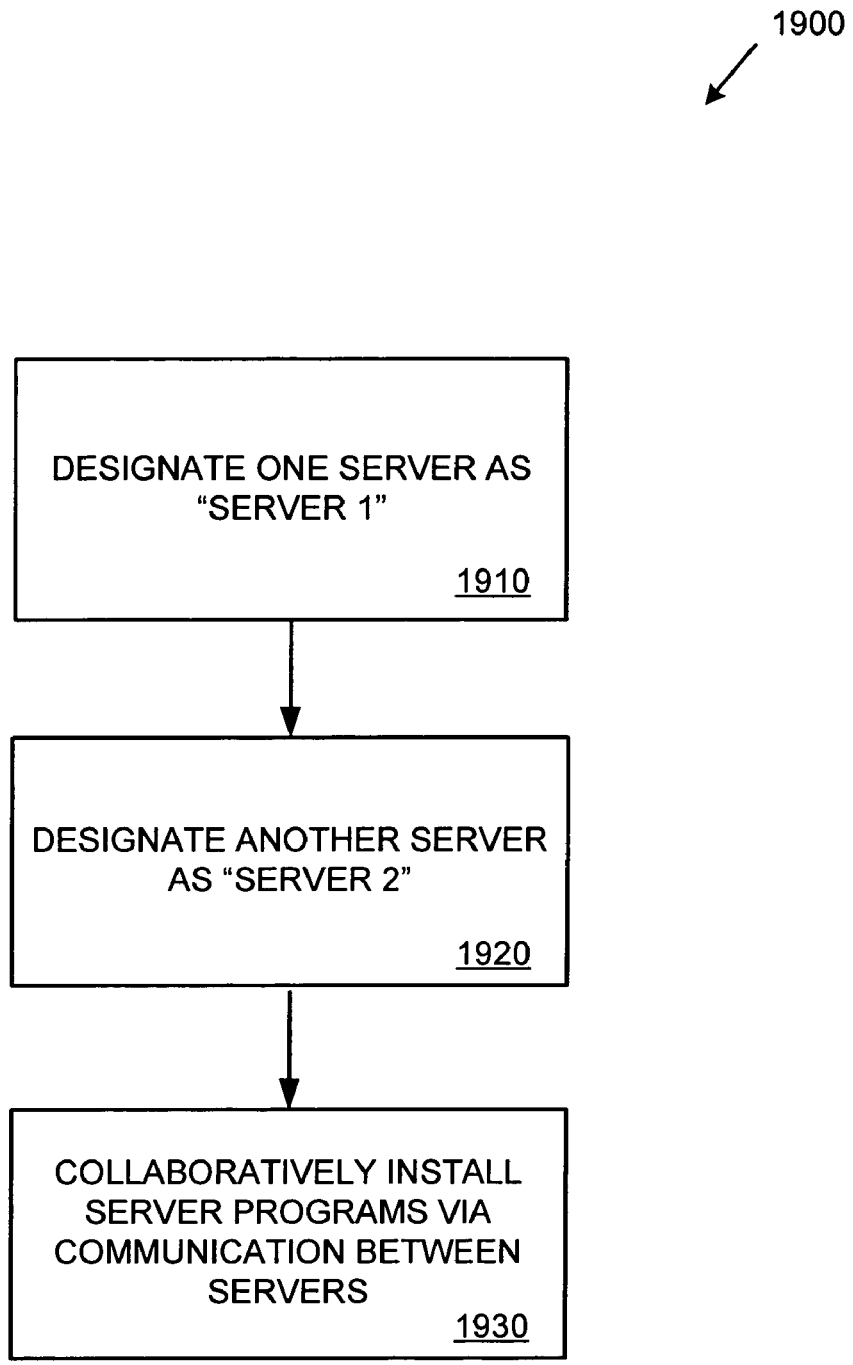

INTEGRATED COMPUTER SERVER IMAGING

BACKGROUND

Despite advances in technology, the field of integrated computer server imaging poses many challenging problems. Generally, a computer user can install an operating system on a computer. When installing the operating system, the user can configure the operating system for the user's environment. The user can then create an image of the operating system and use it to install the operating system (as configured by the user) on other computers. However, the operating system may have specific configuration values or settings that are specific to the installation on the computer used to create the image. This can cause problems for the user who may not know how to reconfigure the operating system after it has been installed from the image (or may not know how to reconfigure without significant effort).

A user may have difficulty in creating more than a single image for a single application or a single operating system. Generally, if a user wants to install an integrated environment of multiple applications and computers, the user purchases various hardware and software and installs and configures each individually. This process can be time consuming and prone to errors.

Furthermore, the user may not understand how to correctly configure multiple integrated computers or applications.

Therefore, there exists ample room for improvement in technologies related to integrated computer server imaging.

SUMMARY

A variety of technologies related to integrated computer server imaging can be applied. Such technologies can be used for creating computer server installation images. For example, an operating system can be installed and configured on a server (e.g., with deployment neutral settings). An application can also be installed on the server and configured (e.g., with deployment neutral settings). After installing the operating system and application, a computer server installation image can be created by imaging the server. In addition, multiple computer server installation images can be created for use in installing an integrated multi-server environment. A genericizing process can also be run to prepare software for imaging.

Such technologies can also be used for installing a plurality of computer servers using a plurality of computer server installation images. For example, a first server can be installed with a first computer server installation image. The first computer server installation image can comprise an operating system and an application (e.g., that have been configured with deployment neutral settings). A second server can be installed with a second computer server installation image. The second computer server installation image can comprise an operating system and an application (e.g., that have been configured with deployment neutral settings). Installing the first and second server can comprise configuring the operating systems and applications with deployment specific settings. In addition, multi-server applications can be installed (e.g., some components on the first server, and others on the second server). Various services (e.g., networking, email, and firewall services) can be provided by the operating systems and applications.

The foregoing and other objects, features, and advantages of the invention will become more apparent from the following detailed description, which proceeds with reference to the accompanying figures.

BRIEF DESCRIPTION OF THE DRAWINGS

FIG. 19 is a flowchart showing an exemplary method for installing a server program suite across a plurality of servers.

DETAILED DESCRIPTION OF EXEMPLARY EMBODIMENTS

Example 1

Exemplary Installable Server Programs

In any of the examples herein, the software being installed can be any installable server program. For example, installable server programs can include any server application offering a service for use by a client. In practice, such server applications can include file sharing services, email servers, firewall services, anti-spam services, anti-virus detection services, networking services (e.g., services for managing identities and relationships that make up a network), and the like.

Installable server programs can also include installable operating system programs, such as an operating system, operating system enhancements, or both.

Example 2

Exemplary Installable Server Program Suite

In any of the examples herein, the installable server programs can be provided as a server program suite. For example, it may be desirable to bundle a collection of installable server programs as a single purchasable unit that can be deployed on a set of two or more server computers.

An installable server program suite can be a suite centered around a particular aspect of the network (e.g., network security) or a full-featured suite that includes a variety of installable server programs (e.g., a bundled server suite including file sharing services, email servers, firewall services, anti-spam services, anti-virus detection services, networking services, or any combination thereof).

If desired, the suite can be targeted to a particular customer (e.g., a mid-sized enterprise). The suite can also include operating system programs (e.g., operating system infrastructure, operating system enhancements, or both) on which the other programs rely.

Example 3

Exemplary Installation of Server Program Suite

Figure 1:
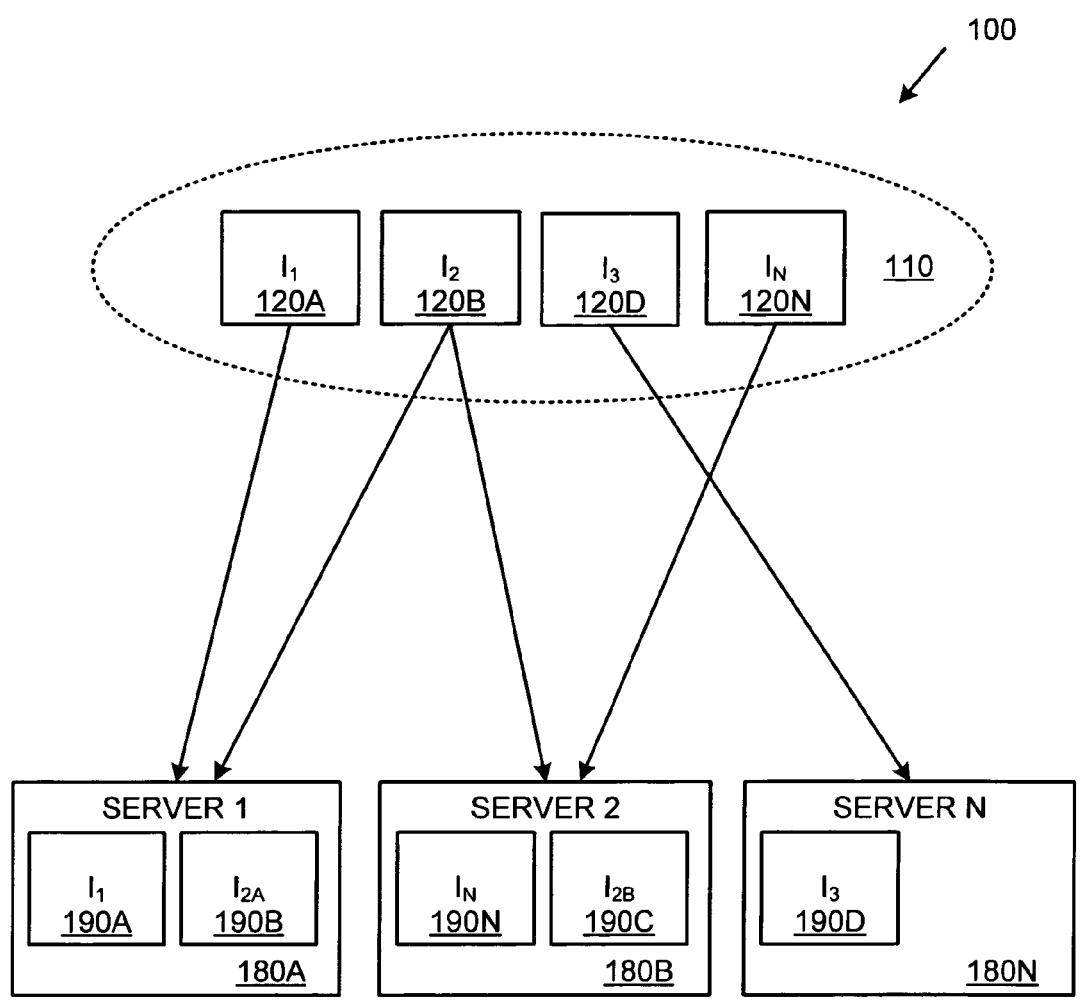
FIG. 1 is a diagram showing an exemplary scenario for installing a plurality of installable server programs from a server program suite.

In any of the examples herein, the described installation technologies can be used to install a server program suite across multiple computer servers. FIG. 1 shows an exemplary scenario 100 in which a plurality of installable server programs 120A-120N in a server program suite 110 are installed as installed programs 190A-190N across a plurality of computer servers 180A-180N.

In the example, at least one program 120B ends up being split across two servers 180A and 180B as two subprograms 190B, 190C. In some cases, such subprograms can be redundant services (e.g., 190B is a redundant service of 190C). Or, such subprograms can have a primary/secondary relationship (e.g., 190B is a primary service, and 190C is a secondary service for the primary service). Or, such subprograms can simply be different parts of a same service (e.g., 190B provides email services for local clients and 190C provides email services for remote clients).

During installation, one or more installation utilities can also be placed on the servers 180A-180N. In this way, a distributed installation of the software suite can be achieved by installation utilities distributed across the servers 180A-180N. The installation utilities at different servers 180A-180N can perform different functions and, as described herein, communicate with each other to collaboratively install the software suite across the plural servers 180A-180N. For example, an installation utility on one server (e.g., 180A) can provide a remotely accessible service that can be accessed (e.g., over a network) from other servers (e.g., 180B-180N).

If desired, the server program suite can be modeled after a set of installable programs that have been originally developed for separate installation. Bundling these programs together for distributed installation can reduce the time and effort involved in installing the programs in the suite.

Example 4

Exemplary Method for Installing a Server Program Suite

Figure 2:
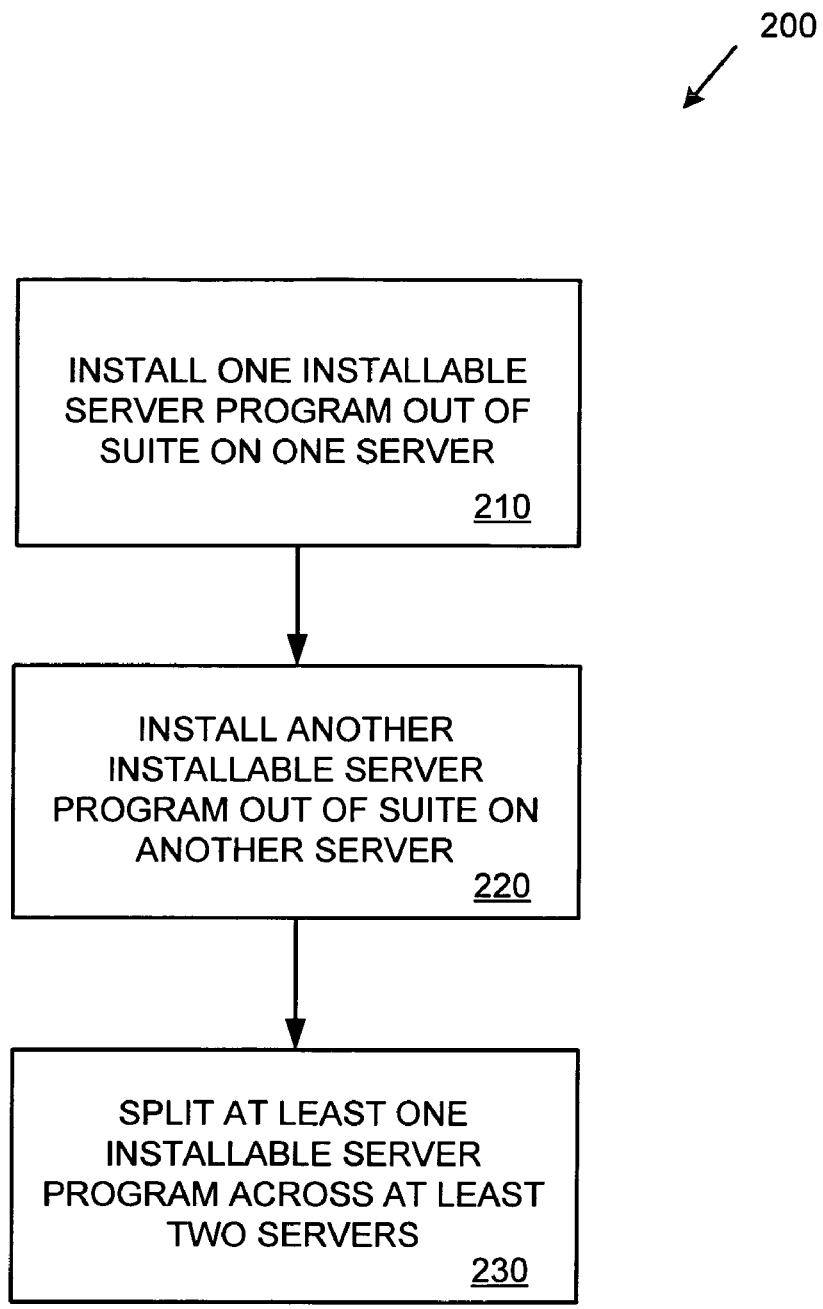
FIG. 2 is a flowchart showing an exemplary method for installing a server program suite.

FIG. 2 shows an exemplary method 200 for installing a server program suite, and can be performed, for example, as part of the scenario shown in FIG. 1. At 210, one installable server program from a server program suite is installed on one server (e.g., one server of a multi-server environment). At 220, another installable server program from the server program suite is installed on a different server. At 230, yet another installable server program from the server program suite is installed across two servers (e.g., some components of the server program are installed on a first server and other components are installed on a second server).

Example 5

Exemplary Installation

In any of the examples described herein, installation can comprise installing software (e.g., operating system, applications) on a computer (e.g., a computer server). Installation can comprise copying files (e.g., from source media such as a CD (compact disc), or over a network such as a local area network or the Internet) to a computer server. Installation can also comprise configuring software (e.g., entering various configuration settings) on a computer server. When installing an application on a server, the entire application can be installed on the server, or only part of the application (e.g., some of the components of the application) can be installed on the server. Furthermore, different parts of a same application can be installed on different servers.

Any of these actions can be performed by an installation utility.

Example 6

Exemplary Deployment Neutral Settings

In any of the examples described herein, software can be configured with deployment neutral settings (settings that can be the same regardless of which customer installs the software). Configuring software can comprise configuring (e.g., creating, entering, modifying) various settings in the software. Deployment neutral settings can be used to configure software in order to prepare the software for imaging. For example, deployment neutral settings can be settings that are not unique to a specific deployment (e.g., installation of the software by a specific customer). Deployment neutral settings can include: installation directories where various software components reside on a storage medium, mail queue directories, web site names and directories, backup schedules, and firewall settings.

Using deployment neutral settings, software (e.g., an operating system and one or more applications) can be configured so that the software can be imaged and later installed from the image by a variety of customers. The customers can then finish customizing the software for their individual environments (e.g., entering computer names, IP (Internet Protocol) addresses, user names, and passwords).

Example 7

Exemplary Deployment Specific Settings

In any of the examples described herein, software can be configured with deployment specific settings. Configuring software (e.g., as part of the installation process) can comprise configuring (e.g., creating, entering, modifying) various settings in the software. Deployment specific settings can be used to configure software when preparing the software for imaging (e.g., deployment specific settings can be required during installation). For example, deployment specific settings can be settings that are unique to a specific deployment (e.g., installation of the software by a specific customer).

Deployment specific settings can comprise: account settings, networking settings, firewall settings, anti-spam settings, unique server identification values (e.g., hardware specific values), configuration details, server names, IP addresses, user names, user account information, and passwords. Sometimes it can be necessary to configure software with deployment specific settings when installing the software (e.g., installing an operating system may require the entry of product key or an administrator user name and password).

Deployment specific settings can also be used to configure software when installing the software from an image. For example, software installed from an image can contain deployment neutral settings. As part of the installation process, the software can be configured (e.g., by a customer who purchased the image for installation on a computer server) with deployment specific settings (e.g., account settings, networking settings, firewall settings, anti-spam settings, server names, IP addresses, user names, user account information, and passwords).

Deployment specific settings can be entered in various ways (e.g., by a user using a user interface on a computer server).

Example 8

Exemplary Customer

In any of the examples described herein, a customer or a user can be a purchaser of software. For example, a customer or a user can be an individual computer owner, a business, or an organization.

Example 9

Exemplary Computer Server Installation Images

In any of the examples described herein, an image of a computer server can be created (a computer server installation image). For example, an operating system and various applications can be installed on a computer server in a controlled environment (e.g., in a lab operated by a software manufacturer). As part of the installation process, various configuration settings (e.g., deployment neutral settings, deployment specific settings) can be applied to the operating system and various applications on the computer server. Once the installation process is complete, an image can be made of the computer server. An image can be made, for example, by making an exact copy of the contents of a storage device (e.g., a hard drive) of the computer server with the installed operating system and various applications (e.g., an exact copy of the contents of a storage device of the computer server onto an optical storage media such as a DVD (digital versatile disk)). An image can be an exact copy of an entire storage device (or multiple storage devices) of a computer server, or an exact copy of only a portion of an entire storage device (e.g., an exact copy of an operating system or an application).

Figure 5:
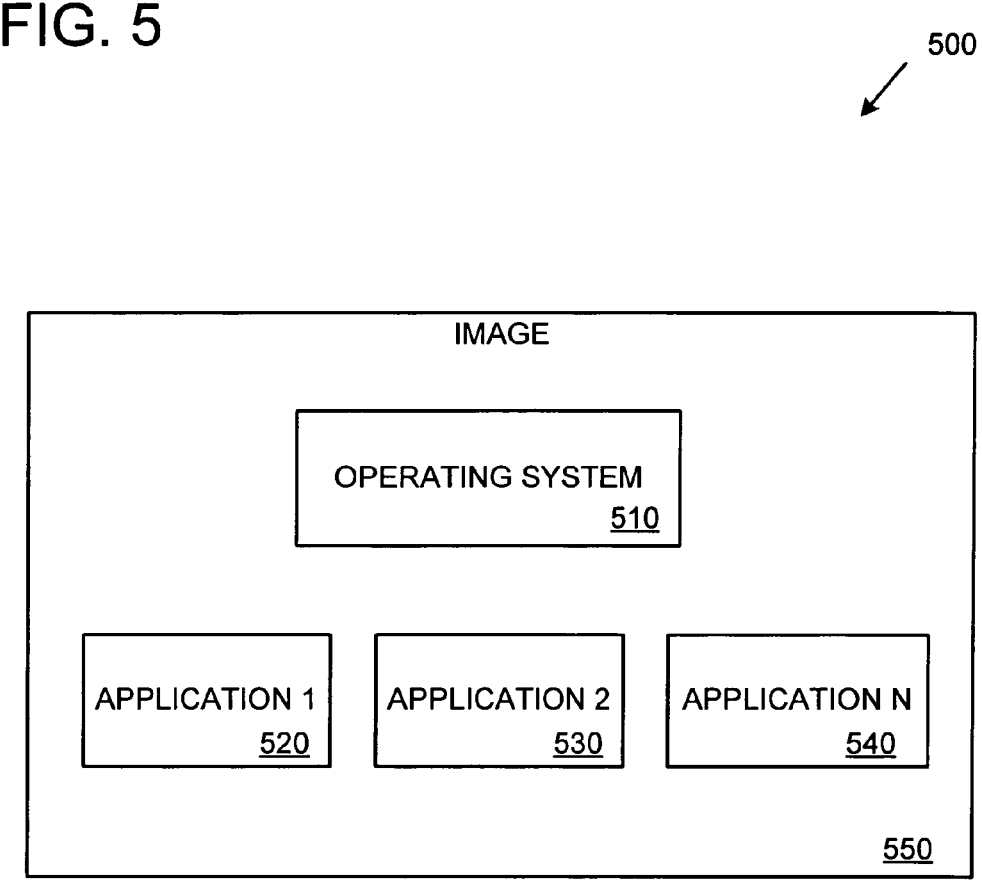
FIG. 5 is a diagram showing an exemplary computer server installation image.

FIG. 5 shows an exemplary computer server installation image 500. In the example, the image 550 comprises an operating system 510 and one or more applications (520, 530, and 540). The operating system can also comprise just the operating system 510, or just one or more applications (520, 530, and 540).

Once an image has been made, the image can be used to install a computer server. An image can be installed, for example, by copying the image onto a storage device of the computer server. For example, an image made by a software manufacturer can be delivered to a customer. The customer can then use the image to install a computer server. For example, the customer can put a DVD containing the image into a DVD drive on the computer server and then start a process (e.g., an automated process) which copies the image onto a storage device (e.g., a hard disk) of the computer server.

By using a computer server installation image, a customer can save a significant amount of time and effort because the customer does not have to separately install, for example, an operating system and various software applications. In addition, a customer who may not have the knowledge or expertise to correctly or optimally install a complex server comprising an operating system and a number of applications can use an image instead. For example, the software manufacturer can create the image after installing (including configuring) an operating system and various applications. The software manufacturer can use its expertise and knowledge of the operating system and applications to correctly and optimally configure them.

Furthermore, the software manufacturer can create one or more computer server installation images from multiple integrated computer servers that the manufacturer has installed and configured with multiple applications (e.g., complex multi-server applications). In this way, a customer can purchase a number of servers and a number of computer server installation images (e.g., a package comprising three servers and three computer server installation images) and use them to install an integrated multi-server environment, all without having to go through the complex installation and configuration process because it has already been done by the manufacturer prior to image creation.

Example 10

Exemplary Imaging System

Figure 3:
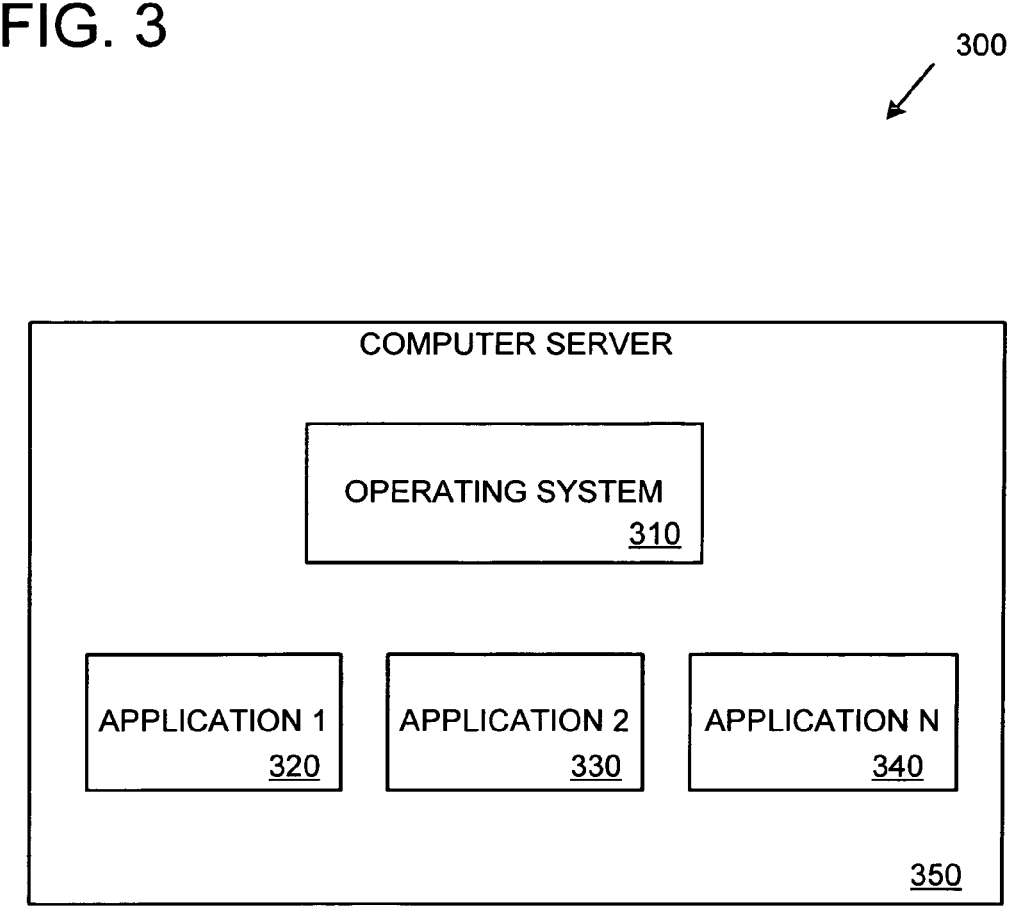
FIG. 3 is a diagram showing an exemplary system for creating computer server installation images.

FIG. 3 shows an exemplary system 300 for creating computer server installation images. The process of creating images (e.g., computer server installation images) is known as imaging. In the example, an operating system 310 can be installed on a computer server 350. In addition to, or instead of, the operating system, one or more applications (e.g., 320, 330, and 340) can be installed on the computer server 350. The computer server 350 can be located at a software manufacturer and the operating system 310 and one or more applications (320, 330, and 340) can be installed on the computer server 350 in a controlled environment (e.g., a software installation lab operated by the software manufacturer). In this way, the server 350 can be installed with settings optimized for a variety of deployment environments.

For example, the software manufacturer can install the server 350 with a specific operating system, applications, and settings optimized for an integrated multi-server environment in which the servers of the integrated multi-server environment operate together to provide services such as: file sharing services, networking services, email services, and firewall services. For example, the services provided by the multi-server environment can be provided to users and devices of a business or organization.

Example 11

Exemplary Method for Creating Computer Server Installation Images

Figure 4:
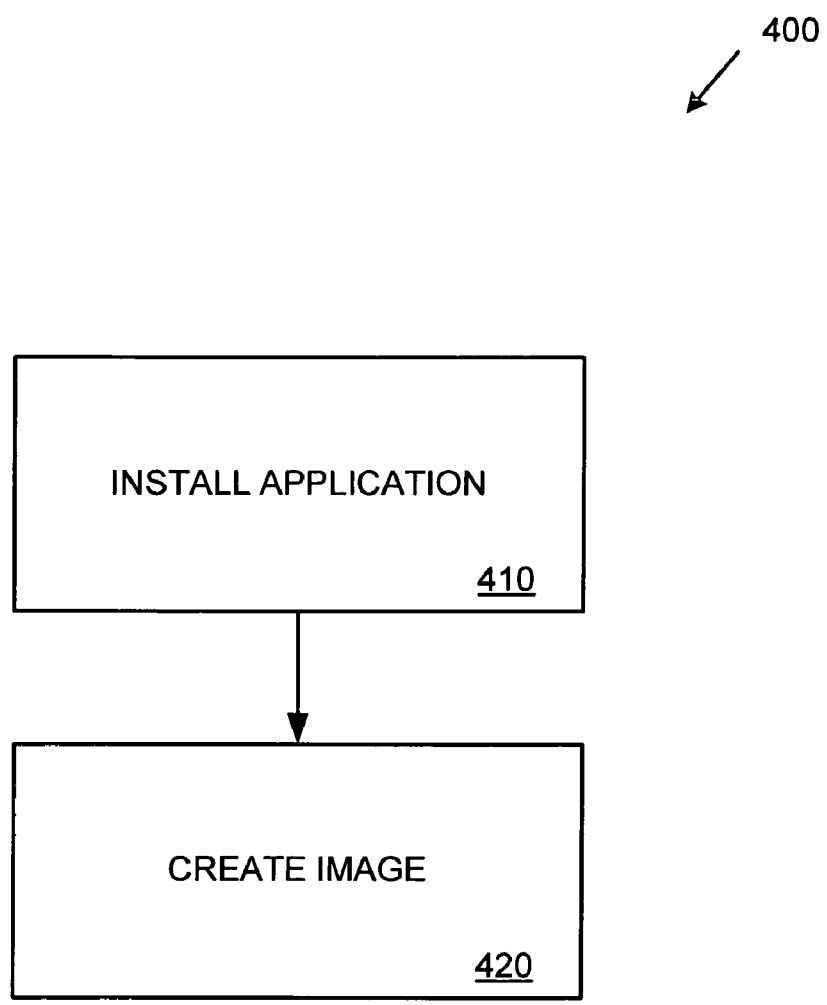
FIG. 4 is a flowchart showing an exemplary method for creating computer server installation images.

FIG. 4 shows an exemplary method 400 for creating computer server installation images and can be performed, for example, by a system such as that shown in FIG. 3. At 410, an application is installed on the computer server.

Alternatively, multiple applications can be installed on the computer server. If multiple applications are installed, the multiple applications can be part of an integrated application package. For example, each of the multiple applications can provide various networking services, such as: DNS (domain name system) services, DHCP (dynamic host configuration protocol) services, file sharing services, and Web server services.

In addition to, or instead of, installing one or more applications, an operating system can be installed on the computer server (e.g., before installing applications or contemporaneously with installing applications).

At 420, an image is created of the computer server. The image can comprise a single image of the entire computer server with the installed application. The image can comprise a single image of the entire computer server with one or more installed applications and/or an installed operating system. The image can also comprise less than the entire computer server (e.g., just one or more applications, or just the operating system).

Example 12

Exemplary Genericizing Method

Figure 6:
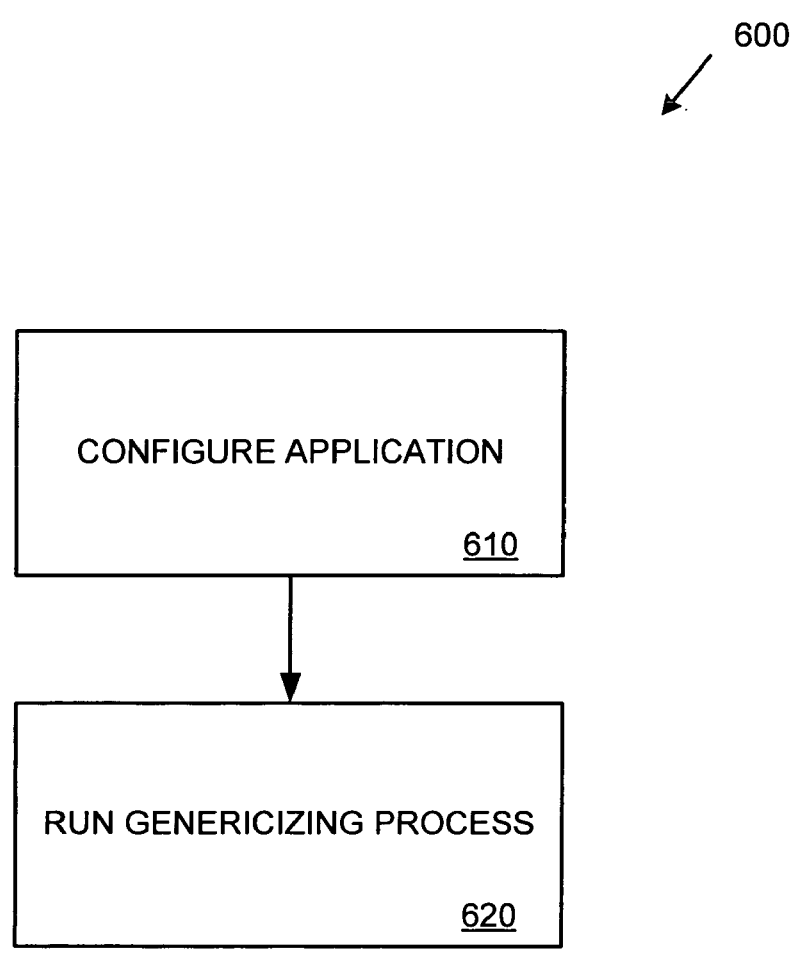
FIG. 6 is a flowchart showing an exemplary method for genericizing software.

FIG. 6 shows an exemplary method 600 for genericizing software. At 610, one or more applications are configured (e.g., as part of installing the one or more applications on a computer server). At 620, a genericizing process is run on the configured one or more applications.

In addition to, or instead of, configuring the one or more applications, an operating system can be configured (e.g., as part of installing the operating system on a computer server). The operating system can be configured prior to, or at the same time as, the one or more applications are configured. The genericizing process can then be run on the configured operating system in addition to, or instead of, the one or more applications.

For example, the genericizing process can be used as part of the process for creating a computer server installation image. The genericizing process can perform a number of tasks in order to prepare the software for imaging. For example, the genericizing process can replace deployment specific settings with deployment neutral settings. An example of replacing a deployment specific setting with a deployment neutral setting can be changing a setting for a network card (e.g., of a server) from a specific static IP address mode to a dynamically assigned IP address mode.

The genericizing process can also remove a unique server identification value. For example, the genericizing process can remove a unique hardware identifier (e.g., a network hardware address, a processor identifier, or some other unique hardware identifier) from a configured operating system or application. In this way, when an image is created containing the operating system, the image will not have the unique hardware identifier of the server on which the operating system was originally installed and the image created, and the image can then be used to install on any server hardware.

For example, when installing software on a server, a server name may be required (e.g., may be required for the software to install and function correctly on the server). A genericizing process can then be run on the server which removes the server name, and an image created. When a customer later installs the image, a server name (e.g., a deployment specific setting) can be entered by the customer (or created randomly).

The genericizing process can be used by a software manufacturer after installing servers in a lab environment (e.g., installing and configuring multiple servers of an integrated multi-server environment).

Example 13

Exemplary Multi-Server Environment

In any of the examples described herein, servers and software can be installed to install a multi-server environment (e.g., a multi-server network). A multi-server environment can be an environment comprising two or more computer servers. For example, multiple computer server installation images can be used to install multiple computer servers of a multi-server environment.

The servers of a multi-server environment can support various resources, such as computer workstations (e.g., desktops and laptops), users (e.g., computer users), and other resources. The servers of a multi-server environment can run software for providing various services (e.g., email services, firewall services, file services, antivirus services, anti-spam services, and networking services) to resources.

The servers in a multi-server environment can be heterogeneous with respect to what software is installed on them. For example, one server may have one set of one or more applications, and another server may have another different set of applications.

The servers of a multi-server environment can also be integrated in various ways. For example, the servers can run operating systems and applications designed to work together to provide services to resources of an organization. The servers can also run operating systems and applications configured to operate together (e.g., one server can provide user account information for use by other servers).

For example, an integrated multi-server environment can comprise three servers. The first server can be a networking server providing networking services, such as: file sharing services, DHCP services, DNS services, print services, and user account services. The second server can be a gateway server providing services such as: network routing services, firewall services, antivirus services, and anti-spam services. The third server can be an email server providing email services. Some services can be split across two or more servers.

For example, remote email access services can be provided by the gateway server while local email access can be provided by the email server.

The servers of a multi-server environment can each have different hardware configurations. For example, one server can have a large hard drive array, another server can have multiple network adapters, and yet another server can have multiple high-speed processors. The different hardware configurations can be adapted for the specific software to be installed on the hardware. For example, a networking server, which will provide file sharing services, can have a large hard drive array.

Example 14

Exemplary Multi-Server Network

Figure 7:
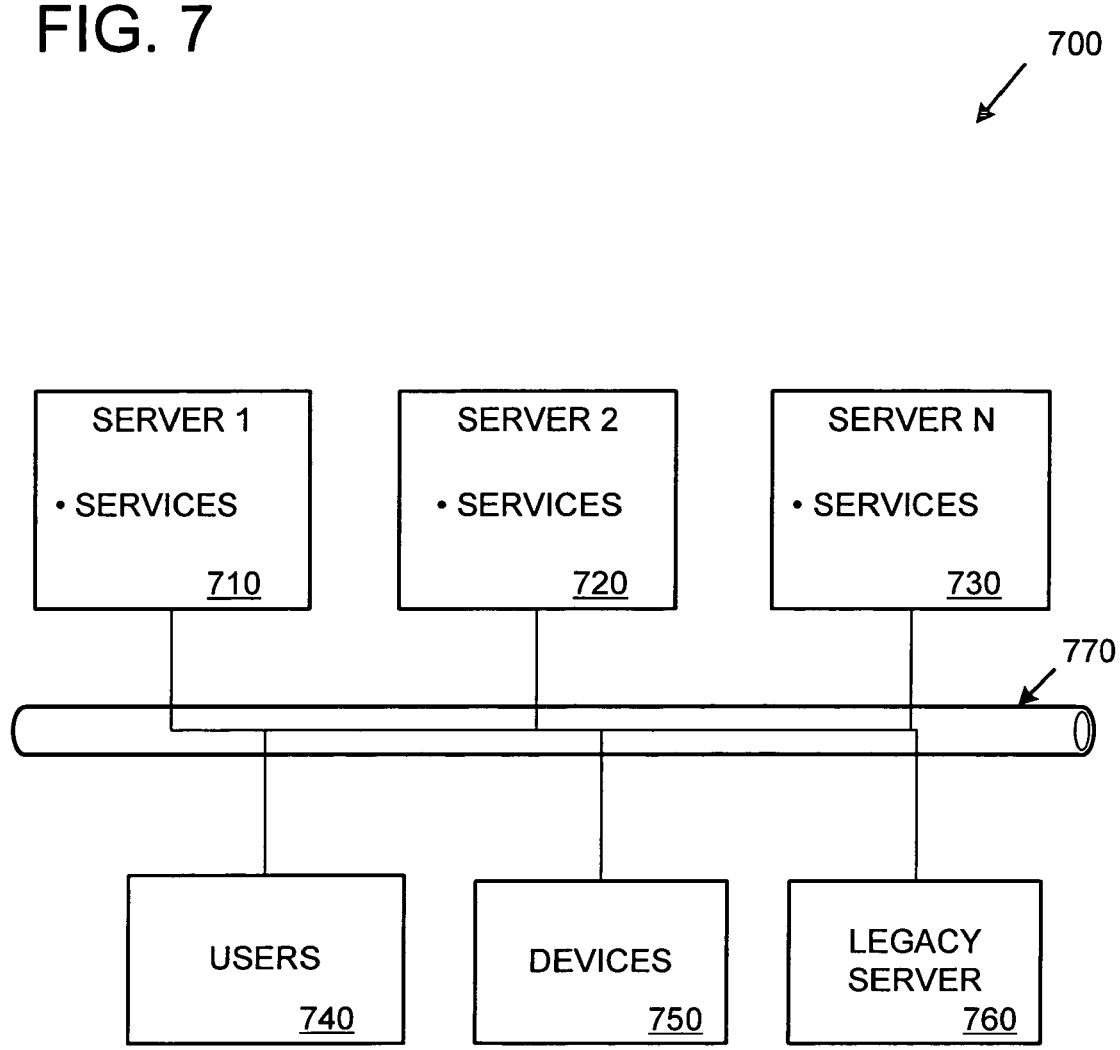
FIG. 7 is a block diagram illustrating an exemplary multi-server network.

FIG. 7 shows an exemplary multi-server network 700. The multi-server network is a computer network. In the example, various items can be associated with the multi-server network.

One or more computer servers (710, 720, and 730) can be associated with the multi-server network. The servers of the multi-server network (710, 720, and 730) can run software for providing various services (e.g., email services, firewall services, file sharing services, antivirus services, anti-spam services, and networking services) to resources (e.g., users 740, devices 750, and a legacy server 760) of the multi-server network.

Users 740 can be associated with the multi-server network. For example, users can be people who use the multi-server network (e.g., typical employee, IT administrator, manager) via a user name or other authentication method.

Devices 750 can also be associated with the multi-server network. For example, devices can be computers (e.g., an employee's desktop or laptop computer), or any other type of device (e.g., printer, copier, scanner, communications device).

Legacy servers 760 can be associated with the multi-server network. For example, a legacy server could be a server running an earlier version of an operating system (or applications) than one or more other servers (e.g., 710, 720, and 730). During an installation process (e.g., installing a computer server installation image on a new server, such as 710, 720, or 730), data and settings can be migrated from the legacy server 760 to one or more servers being installed (e.g., 710, 720, and 730).

The items in the multi-server network 700 can be linked together via a network 770. For example, the network 770 can be physical network cabling, a wireless network, or some combination thereof. Various items can be linked together via various network hardware, protocols, and topologies. For example, the network 770 can be a local area network, a wide area network, or a distributed network. The network 770 can be the network of a business or organization. The network 770 can be connected to other networks (e.g., the Internet).

Example 15

Exemplary Method for Installing Multiple Computer Server Installation Images

Figure 8:
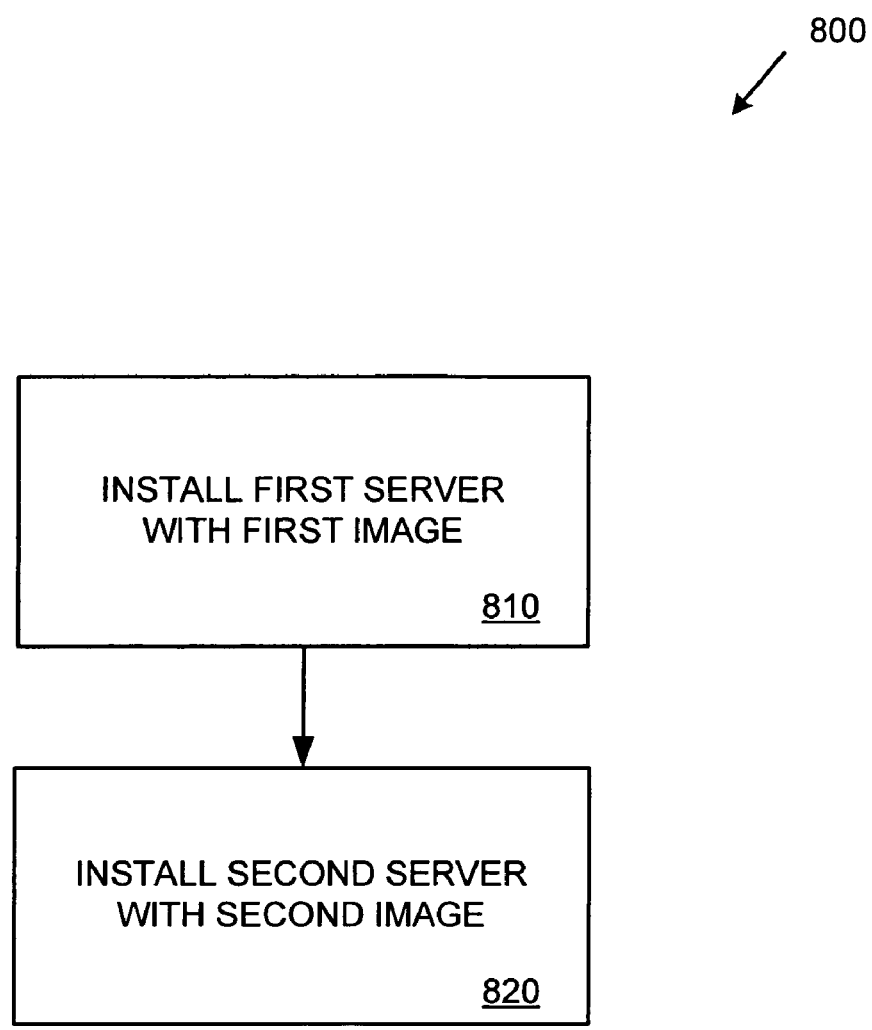
FIG. 8 is a flowchart showing an exemplary method for installing multiple computer server installation images.

FIG. 8 shows an exemplary method 800 for installing multiple computer server installation images on multiple computer servers (e.g., of a multi-server environment or network) and can be performed, for example, by a system such as that shown in FIG. 7. At 810, a first computer server is installed with a first computer server installation image. The first computer server installation image can comprise an operating system and one or more applications. The first computer server installation image can also comprise just an operating system or just one or more applications. The operating system and one or more applications can already be configured, on the first computer server installation image, with deployment neutral settings (e.g., configured with the settings by a software manufacturer before the image was created). Installing the first computer server with the first computer server installation image 810 can also comprise configuring the operating system and one or more applications, after the image has been transferred to the first computer server, with deployment specific settings. For example, the operating system can be configured with deployment specific settings such as a unique server name, an administrator user name, and an administrator password. Deployment specific settings can be entered in various ways (e.g., by a user using a user interface on the first computer server). Operating systems of multiple computer servers can be configured with deployment specific settings by, for example, receiving, via a user interface, a unique server name, an administrator user name, and an administrator password.

At 820, a second computer server is installed with a second computer server installation image. The second computer server installation image can comprise an operating system and one or more applications. The operating system and one or more applications can already be configured, on the second computer server installation image, with deployment neutral settings (e.g., configured with the settings by a software manufacturer before the image was created). Installing the second computer server with the second computer server installation image 820 can also comprise configuring the operating system and one or more applications, after the image has been transferred to the second computer server, with deployment specific settings. For example, the operating system can be configured with deployment specific settings such as a server name, a user name, and a password.

Using this method, an arbitrary (e.g., variable) number of computer servers can be installed with an arbitrary (e.g., variable) number of computer server installation images. The computer servers can be part of a multi-server environment or network (e.g., an integrated multi-server environment or network). For example, one of the servers can provide networking services, one of the servers can provide email services, and one of the servers can provide firewall services.

Computer servers can also be installed with computer server installation images comprising only applications.

Installing a new computer server with a computer server installation image (e.g., the first computer server with the first computer server installation image 810) can also comprise migrating settings and data from a legacy server, such as the legacy server depicted in FIG. 7 at 760. For example, the legacy server can contain user account information (e.g., user names, passwords, and other account information). When installing the new computer server with the computer server installation image, the user account information from the legacy server can be migrated to the new computer server.

Installing a computer server with a computer server installation image can also comprise receiving deployment specific settings for configuring the computer server from a different computer server. For example, when installing the second computer server with the second computer server installation image 820, the second computer server can receive (e.g., over a network such as the network depicted in FIG. 7 at 770) deployment specific settings (e.g., for configuring an operating system that has been installed from the second image on the second server) from the first computer server that has been installed with the first computer server installation image 810.

Example 16

Exemplary User Interface for Entering Settings

Figure 9:
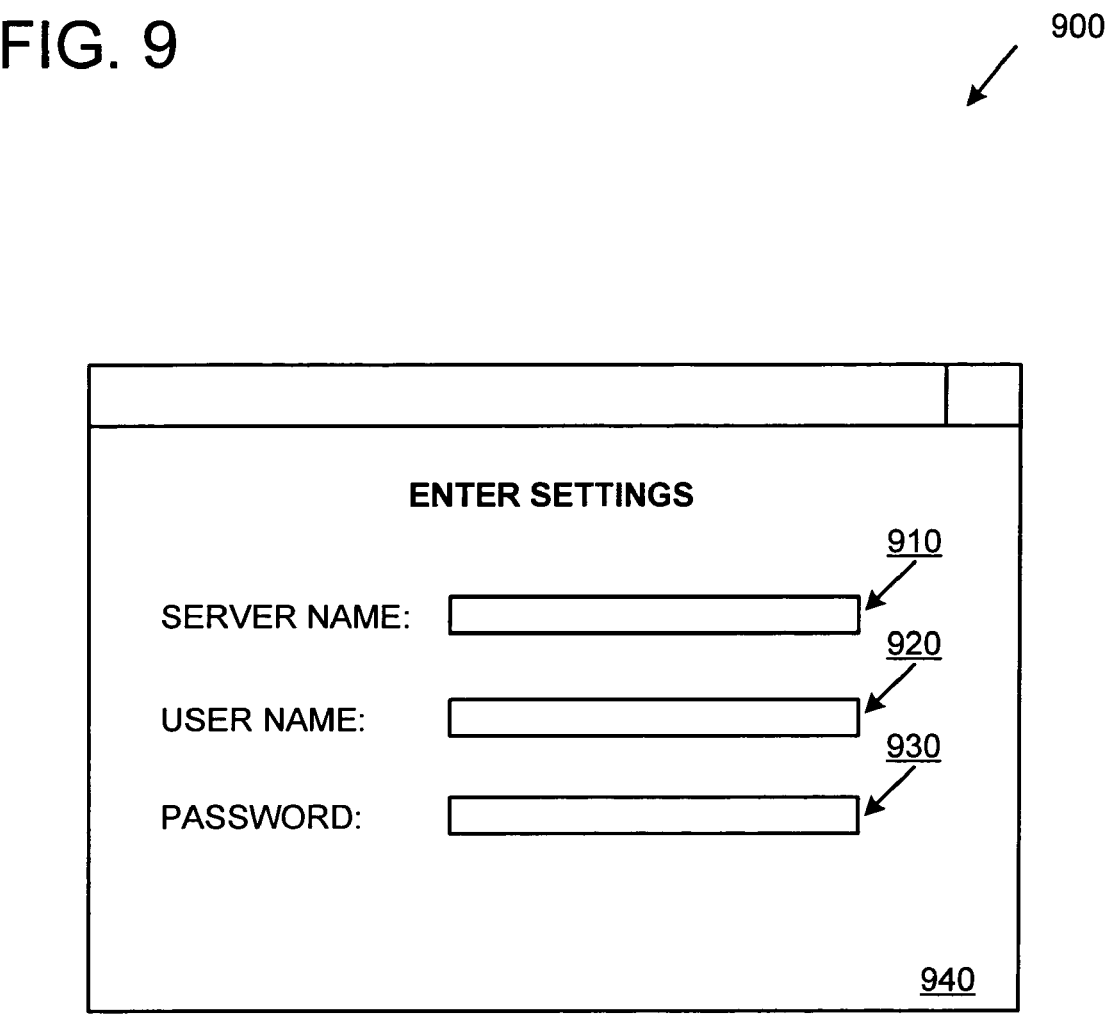
FIG. 9 is a diagram showing an exemplary user interface for entering configuration settings.

FIG. 9 shows an exemplary user interface 900 for entering (or receiving) settings (e.g., configuration settings). For example, the user interface 940 can be used to enter (or receive) deployment specific settings (e.g., as part of the installation process of installing a computer server installation image on a computer server). In the example, a server name can be entered 910 (e.g., by a user configuring a computer server). The user interface 940 also supports entering a user name 920 and a password 930 (e.g., for an administrator account).

Instead of, or in addition to, the specific configuration settings (910, 920, and 930) entered in the user interface 940, other configuration settings can be entered. For example, configuration settings regarding IP addresses, DNS information, and migration choices can be entered.

Example 17

Exemplary Image Creation and Installation System

Figure 10:
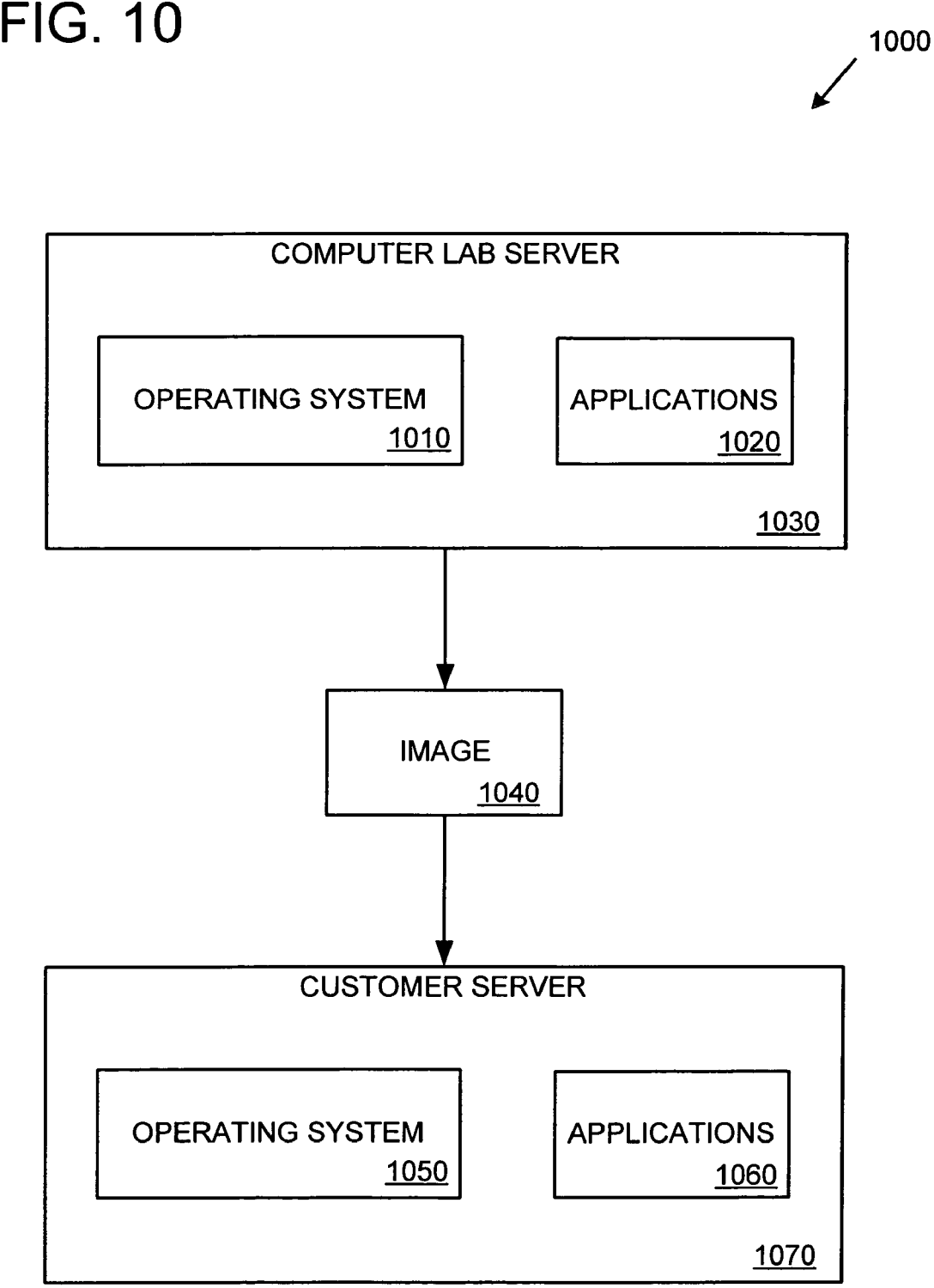
FIG. 10 is a diagram showing an exemplary system for creating and installing computer server installation images.

FIG. 10 shows an exemplary system 1000 for creating and installing computer server installation images. In the example, an operating system 1010 and one or more applications 1020 are installed on a computer lab server 1030 (e.g., a computer server in a computer lab of a software manufacturer). After the installation, including any configuration (e.g., with deployment neutral settings), has been completed, an image 1040 (e.g., a computer server installation image) of the computer lab server 1030 is created.

The image 1040 can be sold to a customer. For example, the customer can purchase the image for installation on a computer server owned by the customer. The customer can also purchase the image as part of a package that comprises a computer server that has a hardware configuration optimized for the software on the image. Similarly, the customer can purchase multiple images for installation on multiple computer servers (e.g., as a package for use as an integrated multi-server environment).

Once the customer acquires the image 1040, the customer installs the image on a customer computer server 1070. By installing the image, the operating system 1050 and the one or more applications 1060 are installed on the customer server 1070.

Because the image 1040 can comprise an exact copy of the operating system 1010 and applications 1020 on the computer lab server 1030, the corresponding operating system 1050 and applications 1060 installed on the customer server 1070 can be exactly the same (e.g., the same software with the same configuration settings).

As part of the process of installing the image 1040, the customer can configure the operating system 1050 and applications 1060 with configuration settings appropriate (e.g., deployment specific settings) for the customer's environment.

Example 18

Exemplary Knowledge Base

In any of the examples described herein, a knowledge base (e.g., an installation knowledge base) can be used to answer questions (e.g., installation questions) regarding installation (e.g., of servers or software). A knowledge base can be used during installation to provide answers that a user performing the installation may not know (e.g., how to configure a complex application, in which order multiple applications should be installed, which applications to install on which server). Decisions (e.g., installation decisions) can be made based on knowledge base information. A knowledge base can be created by a software manufacturer and the knowledge base can comprise the expertise and know-how of the software manufacturer regarding various installation procedures and tasks.

A knowledge base can be a collection of information or rules in the form of a database, logic, or both.

A user interface can be displayed to a user whereby the user can decide whether or not to apply various rules in the knowledge base.

For example, a user installing a DHCP service in a multi-server environment can be asked a question regarding a DHCP range. The answer provided by the user can then be used when consulting a knowledge base. The knowledge base can contain rules that, based on the answer, provide a recommended configuration for configuring multiple servers to provide distributed, optimized, and redundant DHCP service.

A knowledge base (e.g., an installation knowledge base) can be located at a variety of locations. For example, a knowledge base can be located on a server, computer, device, or computing device. A knowledge base can be local or remote. For example, a knowledge base can be on a local server (e.g., a server of an integrated multi-server environment of a business or organization). A knowledge base can also be located at a remote location (e.g., on a server of a software manufacturer or at a remote third party location). During installation, a knowledge base at a remote location can be consulted (e.g., in order to make installation decisions regarding installation of a local multi-server system).

For example, answers can be entered on a local server or computing device. The settings can then be

Example 19

Exemplary Remotely Accessible Service

In any of the examples described herein, a remotely accessible service can be used to transfer information between computer servers. A remotely accessible service can operate on a server (e.g., on a network port of the server, such as a TCP (transmission control protocol) or UDP (user datagram protocol) port). A remotely accessible service can accept a connection from another server on a network (e.g., a local area network or a wide area network). Information can then be transferred between the two servers connected via the remotely accessible service. Such information can include: configuration settings, installation questions, installation answers, and other data. The information transferred between the servers can also be encrypted. For example, passwords or other sensitive information can be encrypted before being sent over the remotely accessible service, and decrypted when received.

Example 20

Exemplary Installation Question

In any of the examples described herein, an installation question can be asked. For example, an installation question can be asked via a user interface on a computer server. An installation question can be a question regarding a setting (e.g., a configuration setting for use during server or software installation), or another aspect of installation (e.g., whether to migrate a service, or delay migrating a service). Installation questions can be answered by various methods (e.g., by a user, by a previously entered installation answer, by consulting a knowledge base).

Example 21

Exemplary Installation Answer

In any of the examples described herein, an installation answer can be provided. For example, an installation answer can be entered by a user via a user interface (or received by a computer server via a user interface). An installation answer can also be transmitted to servers, devices, computing devices, or web services. Installation answers can comprise settings (e.g., a configuration setting for use during server or software installation). Installation answers can also relate to other aspects of installation (e.g., whether to migrate a service, or delay migrating a service). Previously entered or received installation answers can also be used to answer additional installation questions (e.g., on different servers).

For example, installation answers can be provided on server, devices, or computing devices and transmitted to a remote location, such as a remote web service (e.g., hosted by a software manufacturer). Calculations (e.g., installation decisions) can then be made at the remote location (e.g., by the remote web service based on an installation knowledge base located at the remote web service). The results of the calculations can be transmitted back and used to install or configure software on multiple servers, devices, or computing devices, or processed as answers to additional installation questions (e.g., in place of asking the user).

Example 22

Exemplary Installation Decision

In any of the examples described herein, an installation decision can be made. An installation decision can be a decision regarding installing and configuring software. For example, if a user is asked an installation question on a first server (e.g., regarding a network setting), the answer can be use to make an installation decision on the first server, or on a second server (e.g., configuring an application on the second server based on the network setting). An installation decision can also be made after consulting an installation knowledge base.

For example, a decision can be made to propogate a configuration setting to one or more servers (e.g., based on consulting an installation knowledge base).

For example, if a user is asked whether to migrate a service from a legacy server to a new server, the answer can be used to make a decision regarding the migration (e.g., which settings or data to migrate, when to perform such migration as part of an installation process, and whether the settings or data should be migrated to multiple servers).

Example 23

Exemplary Computing Device

In any of the examples described herein, a computing device can be a device used for computing purposes. For example, a computing device can be a computer (e.g., a server or user computer), handheld or mobile device (e.g., a PDA or tablet computing device), networking device (e.g., a firewall device, router, gateway), printer, or mobile communications device (e.g., a cell phone or a smart phone). A computing device can be installed (e.g., by installing and configuring software on the computing device).

Example 24

Exemplary System for Installing Integrated Computer Servers

Figure 11:
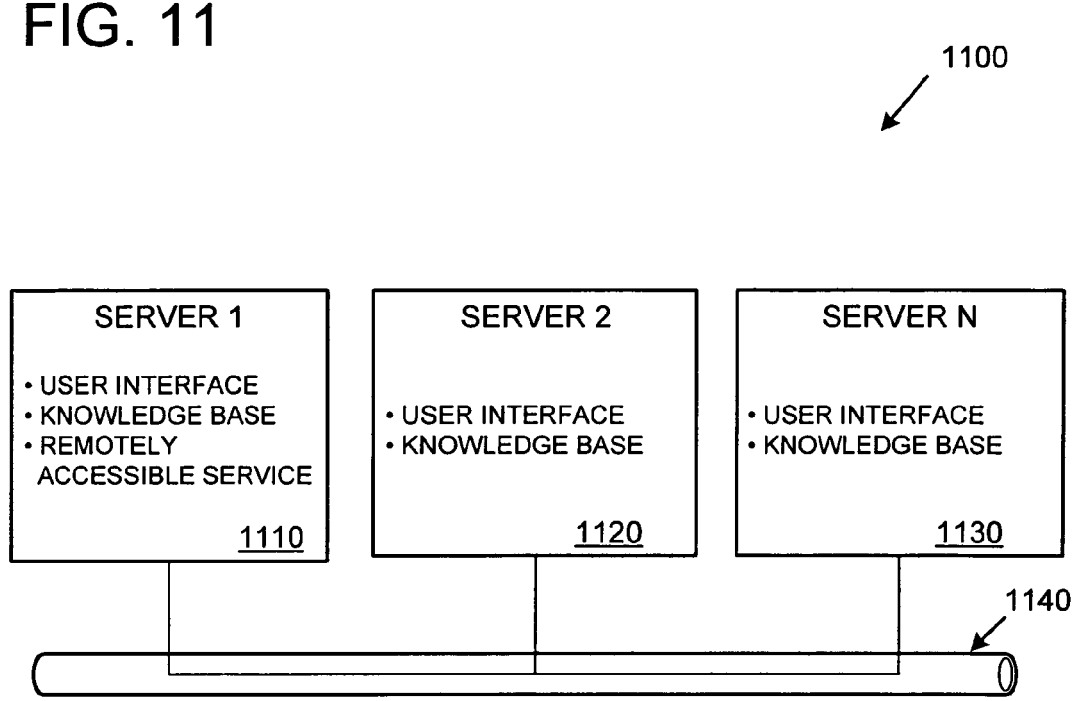
FIG. 11 is a diagram showing an exemplary system for installing integrated computer servers.

FIG. 11 shows an exemplary system 1100 for installing integrated computer servers. In the example, an arbitrary number of computer servers (e.g., 1110, 1120, and 1130) can be installed. For example, a first server 1110 can provide a user interface, an installation knowledge base, and a remotely accessible service. Software can be installed on the first server 1110 and configured via the user interface on the first server 1110. Installation decisions can also be made on the first server 1110 by consulting the installation knowledge base. Installation answers (e.g., provided by a user installing the servers via a user interface) can be received on the first server 1110 via the user interface and can be provided from the first server 1110 via the remotely accessible service. Installation answers can also be used to install and configure software on the first server 1110, and can be used in making installation decisions.

In the example, a second server 1120 can be installed. For example, as part of the installation process, the second server 1120 can receive an installation answer from the first server 1110 via the remotely accessible service (e.g., by connecting to the remotely accessible service on the first server). Software can be installed on the second server 1120 and configured via the user interface on the second server 1120 or using the installation answer received from the first server 1110. Installation decisions can also be made on the second server 1120 by consulting the installation knowledge base (e.g., based on the installation answer).

An arbitrary (e.g., variable) number of servers (e.g., 1110, 1120, and 1130) can be connected via a network 1140. For example, the network 1140 can be physical network cabling, a wireless network, or some combination thereof. Various items can be linked together via various network hardware, protocols, and topologies. For example, the network 1140 can be a local area network, a wide area network, or a distributed network.

For example, an installation answer (e.g., configuration setting) received by the first server 1110 via the user interface on the first server can, be stored on the first server. The installation answer can be stored on a storage device on the first server 1110 (e.g., in a file on a hard drive, in a cache, on a removable computer media such as a flash device). The installation answer can be encrypted (e.g., when it is stored). The installation answer can then be transmitted from the first server 1110 to other servers (e.g., 1120 and 1130). For example, the installation answer can be transmitted over a network connecting the servers (e.g., 1140). The installation answer can also transmitted by physically moving a removable computer media (e.g., a floppy disk, CD, or USB flash device). The installation answer can be transmitted in encrypted or unencrypted form. If an installation answer is transmitted in encrypted form, then it can be decrypted when received. In this way, an installation answer provided by a user can be used on other servers (e.g., for installing software) without the user having to go to the other servers and answer the same, or similar, questions or make the same, or similar, installation or configuration decisions.

Example 25

Exemplary Method for Installing Integrated Computer Servers

Figure 12:
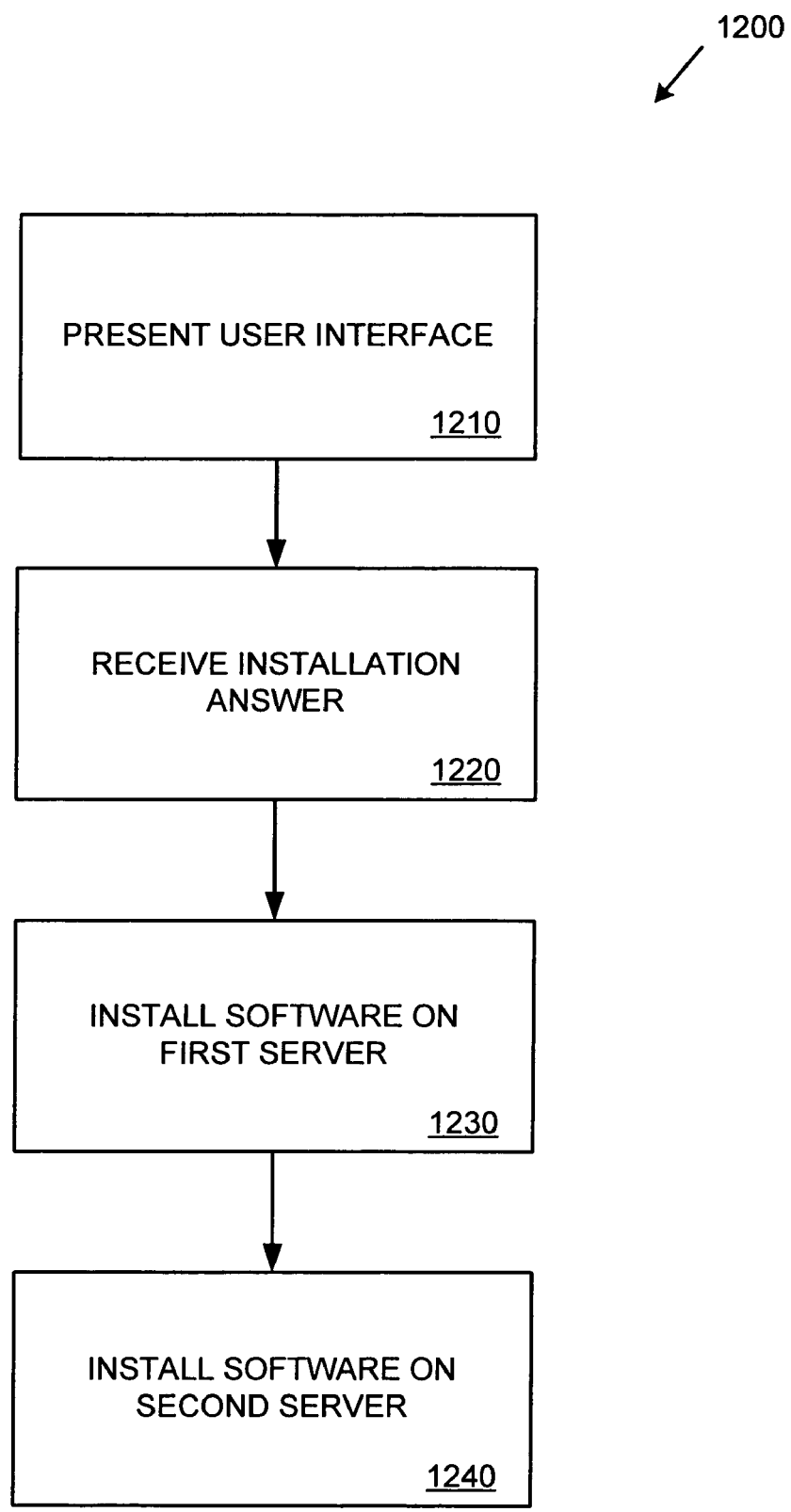
FIG. 12 is a flowchart showing an exemplary method for installing integrated computer servers.

FIG. 12 shows an exemplary method 1200 for installing integrated computer servers and can be performed, for example, by a system such as that shown in FIG. 11. At 1210, a user interface is presented on a first server. At 1220, an installation answer is received in response to the user interface. At 1230, software (e.g., operating system, application, one or more components of an application) is installed on the first server according to the installation answer. For example, components of a multi-server application can be installed on the first server. At 1240, software is installed on a second server according to the installation answer. For example, other components of a multi-server application can be installed on the second server.

For example, a user can enter various configuration settings (e.g., server names, user names, and passwords) via a user interface when installing a first server. The first server can be installed according to the configuration settings (e.g., configured with the server name entered by the user). In addition, other servers (or other devices) can be configured with the configuration settings entered on the first server (e.g., configured with server names). For example, the configuration settings can be transmitted from the first server to the other servers (e.g., via a remotely accessible service).

A user interface can also be presented on the second server to receive additional installation answers. These additional installation answers can be used in addition to, or instead of, the installation answer received from the first server to install software on the second server. For example, a user can enter an installation answer via a user interface on the second server because it would be a security risk to transmit the installation answer from the first server to the second server. For example, the installation answer may comprise a user account password (e.g., an administrator password).

Computing devices can be installed in addition to, or instead of, computer servers. For example, an installation answer can be received on a computer server and transmitted to a computing device. The computing device can use the installation answer to install software. Computing devices can also receive installation answers directly (e.g., via a user interface displayed on the computing device) and use the installation answers to install software. An installation knowledge base can be located on a computing device (e.g., for use when making installation decisions).

Example 26

Exemplary Method for Storing and Transmitting Installation Answers

Figure 13:
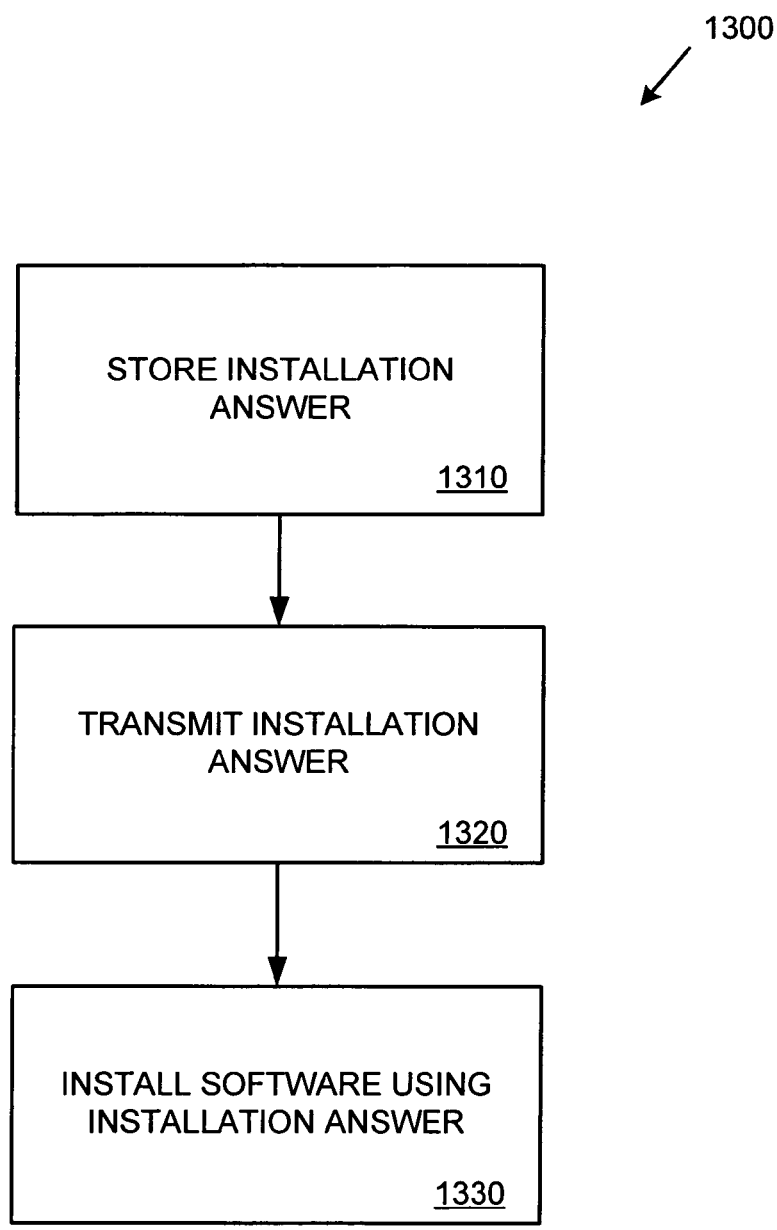
FIG. 13 is a flowchart showing an exemplary method for storing and transmitting installation answers.

FIG. 13 shows an exemplary method 1300 for storing and transmitting installation answers and can be performed, for example, by a system such as that shown in FIG. 11. At 1310, an installation answer is stored (e.g., on a server). For example, installation answer can be stored in a file on the server. At 1320, the installation answer is transmitted (e.g., from a first server to a second server). The installation answer can be transmitted via a remotely accessible service. The installation answer can also be transmitted via other methods (e.g., floppy disk, CD, USB flash device). At 1330, software is installed using the installation answer.

For example, an installation answer (e.g., a configuration setting such as a server name, IP address, user name, or password) can be entered by a user on a first server. Then, the installation answer can be transmitted from the first server to a second server (e.g., via a remotely accessible service). Finally, the installation answer can be used on the second server to install software (e.g., configure an operating system with a server name or IP address) on the second server. In this way, a user can provide an installation answer once on a first server and the answer can be used on other servers (e.g., for automated installation of software on the other servers).

Example 27

Exemplary Method for Answering Additional Installation Questions

Figure 14:
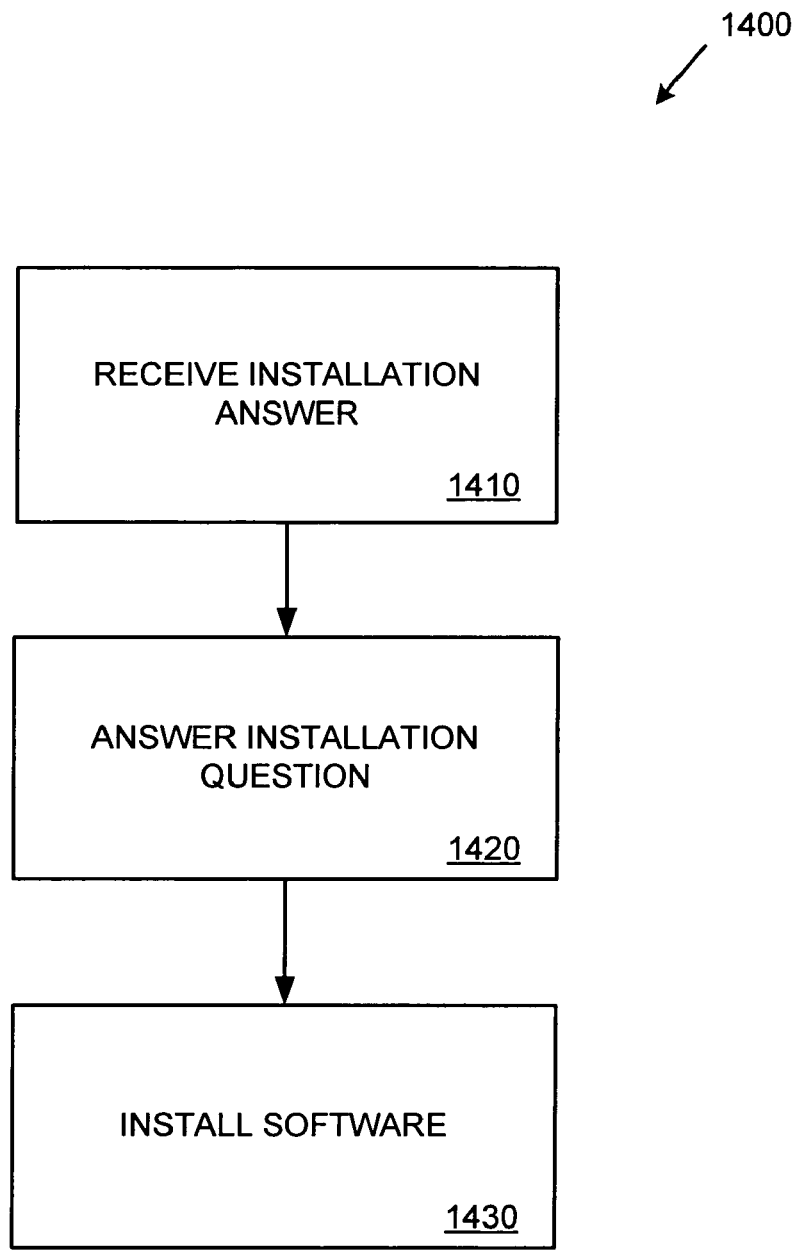
FIG. 14 is a flowchart showing an exemplary method for answering additional installation questions.

FIG. 14 shows an exemplary method 1400 for using an installation answer to answer additional installation questions and can be performed, for example, by a system such as that shown in FIG. 11. At 1410, an installation answer that was used to answer an installation question on a first server is received by a second server from the first server (e.g., via a remotely accessible service). At 1420, an additional installation question for installing software on the second server is answered (a subsequent installation answer) using the installation answer from the first server. At 1430, software is installed on the second server according to the subsequent installation answer.

For example, a user, who is installing a new server on a network, can be asked whether an existing service (e.g., an email service) should be migrated to the new server. The answer provided by the user can be received by a second new server and used to answer an additional installation question such as whether an email service should be installed on the second server, or whether the email service should be split between multiple servers (e.g., a local email access component on one server and a remote email access component on a different server).

Example 28

Exemplary Parallel Installation

In any of the examples described herein, installation of software (e.g., operating systems, applications, and components of applications) can be parallel in operation. For example, different applications can be installed on different servers (e.g., of an integrated multi-server environment) at the same time (e.g., concurrently or simultaneously). Parallel installation can be efficient because total installation time can remain the same when additional software (e.g., on additional servers) is added to the installation process.

While some software can be installed completely independently, other software can require a specific order of installation. Parallel installation can provide a mechanism to enforce ordering when required. Installation can be synchronized by using an installation knowledge base.

For example, a first application can be installed on a first server, where the first server comprises an installation knowledge base. The installation knowledge base can contain synchronization rules. One of the synchronization rules can specify that additional applications (e.g., a second and third application) can be installed in parallel, but only after the first application has been installed on the first server (e.g., the additional applications are dependent on installation of the first application). Based on the synchronization rule, the additional applications can then be installed (after installation of the first application has completed) in parallel on the first server or on one or more different servers. The different servers can check the status of installation of the first application (e.g., by connecting, over a network, to a remotely accessible service running on the first server) in order to start installation of the additional applications at the appropriate time.

Example 29

Exemplary Automated Installation

In any of the examples described herein, an installation can be automated. For example, a user can answer an installation question (e.g., by entering configuration settings) on one server and the answer to the installation question can be used to install other servers (e.g., by transmitting the installation answer to the other servers) without any further involvement by the user. Or, the user can have some involvement in an automated installation. For example, the user can answer some additional installation questions on other servers, while other additional installation questions can be answered automatically by installation answers transmitted from other servers.

Example 30

Exemplary Distributed Installation

In any of the examples described herein, installation can be distributed. For example, instead of separate installations being run on separate machines (e.g., on different computer servers to install software), a single installation can be distributed across multiple machines (e.g., across multiple computer servers).

By using a distributed installation, it can be easier and more efficient to install multiple servers and multiple software packages (e.g., operating systems or applications) across the multiple servers. For example, installing a multi-server application can be easier because a distributed installation can install some components of the multi-server application on one server and other components on a different server. In addition, configuration settings can be more easily shared across multiple servers using a distributed installation.

Example 31

Exemplary Method for Automated Distributed Installation of Applications

Figure 15:
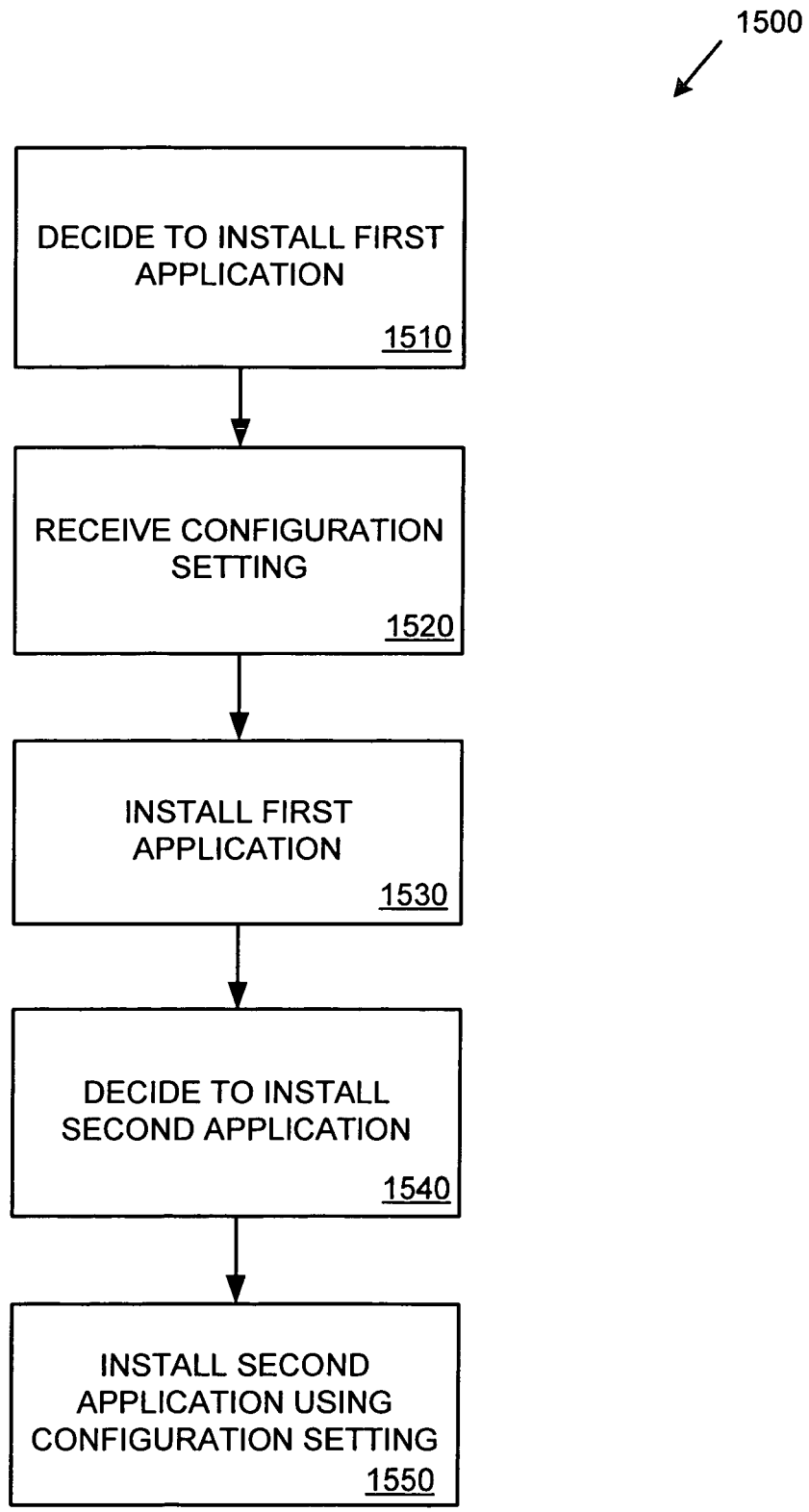
FIG. 15 is a flowchart showing an exemplary method for automated distributed installation of applications.

FIG. 15 shows an exemplary method 1500 for automated distributed installation of applications and can be performed, for example, by a system such as that shown in FIG. 11. At 1510, a decision is made to install a first application on a first server (e.g., of an integrated multi-server environment).

For example, the decision can be made by an automated discovery process. The automated discovery process can comprise discovering (e.g., by broadcasting on a network connection) that no other servers of an integrated multi-server environment have yet been installed. For example, the first server to be installed of an integrated multi-server environment can be installed with specific applications and settings (e.g., DNS, DHCP, and file sharing).

The decision can be made, for example, based on a hardware configuration of the server. For example, if the first server has a specific hardware configuration (e.g., a large hard drive array), then a decision can be made to install a specific application (e.g., file sharing).

The decision can also be made by consulting an installation knowledge base on the first server. For example, the installation knowledge base can specify which applications to install on the first server (e.g., network and file sharing applications). The installation knowledge base can also be used in combination with other methods of making the decision (e.g., automated discovery process and hardware configuration).

At 1520, a configuration setting is received (e.g., via a user interface from a user installing the first application on the first server). At 1530, the first application is installed on the first server. At 1540, a decision is made (e.g., using any of the methods discussed above with regard to 1510) to install a second application on a second server (e.g., of the integrated multi-server environment). For example, using the automated discovery process, the second server can discover that there is already a first server installed on the network. For example, based on the discovery, the decision can comprise installing a firewall application on the second server. At 1550, a second application is installed on the second server using the configuration setting received at 1520.

For example, a decision can be made to install an external email portal on the second server, and the external email portal can be configured using the configuration setting (received from the first server) to access an email storage account on the first server.

Additional decisions can be made regarding installing additional applications or components of applications. Decisions can also be made based on a configuration setting entered by a user. For example, a decision can be made to install components of an application on the first server and other components of the application on the second server based on the configuration setting. An application that has components installed on multiple servers can be a multi-server application (e.g., an email application with local email access components installed on one server and remote email access components installed on a different server).

Example 32

Exemplary Method for Installing Multiple Computer Servers

Figure 16:
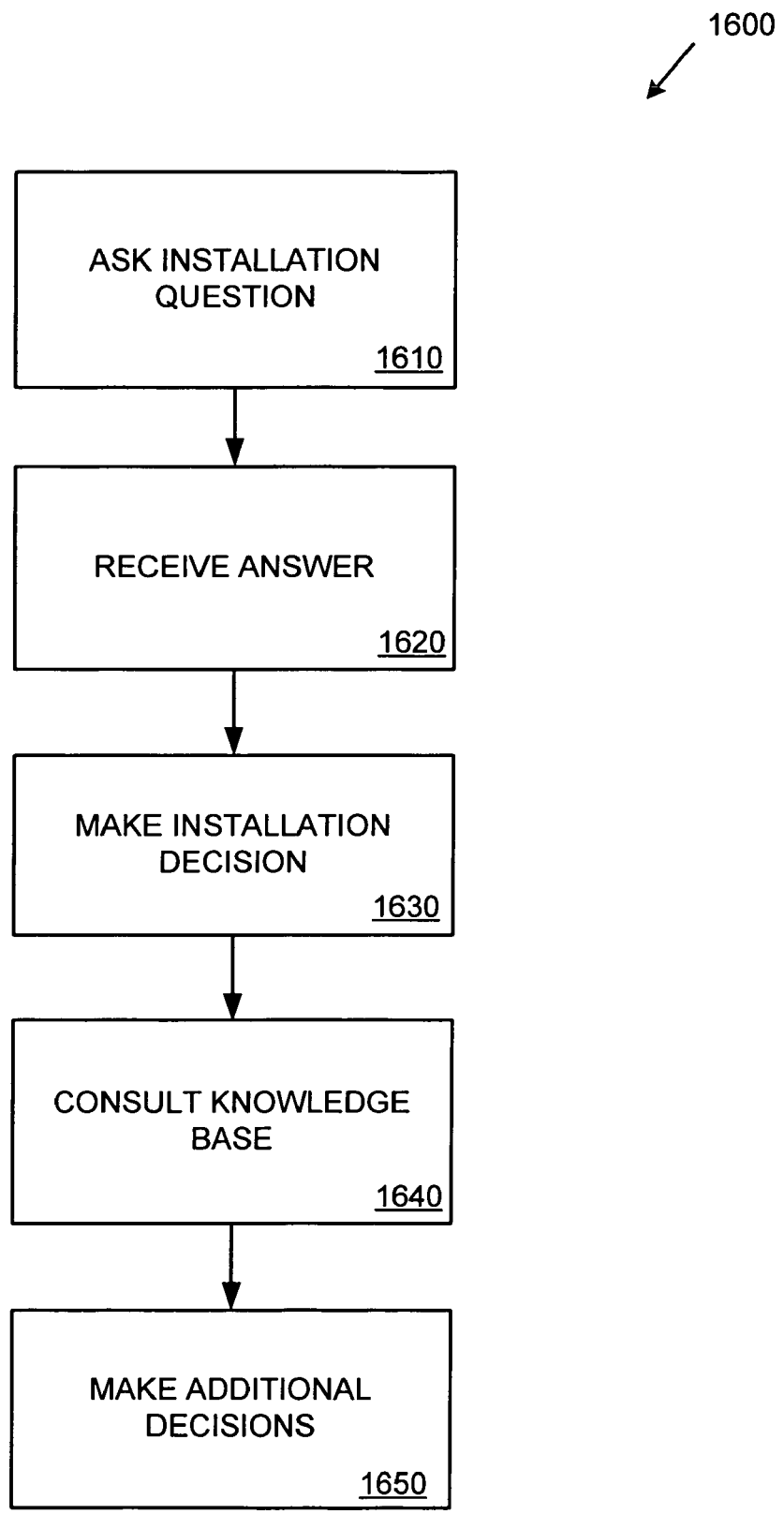
FIG. 16 is a flowchart showing an exemplary method for installing multiple computer servers.

FIG. 16 shows an exemplary method 1600 for installing multiple computer servers and can be performed, for example, by a system such as that shown in FIG. 11. At 1610, a user installing the servers is asked an installation question. For example, the user can be asked whether to migrate a service (e.g., networking service, email service, user account service) from a legacy server.

At 1620, an installation answer to the installation question is received. At 1630, an installation decision is made regarding configuring a first server based on the installation answer. For example, if the user answered affirmatively to migrating a service, then the installation decision can comprise various configuration settings related to the migration of the service (e.g., networking service configuration, email service configuration, user account service configuration).

At 1640, a knowledge base (e.g., an installation knowledge base) is consulted based on the answer. The knowledge base can contain answers regarding subsequent installation questions. For example, if the user is migrating a service from a legacy server, the knowledge base can answer additional installation questions such as which applications, or which components of which applications, will need to be installed on which servers to support the migrated service. By using a knowledge base to answer additional installation questions, the installation can skip asking the user the additional installation questions.

At 1650, additional installation decisions are made, based on the consultation of the knowledge base, regarding installation of a second server. For example, if the user is migrating a service from a legacy server, the additional installation decisions can relate to installing applications on the second server to support the migrated service.

Example 33

Exemplary Execution of Installation

The technologies described herein can be applied to install a server program suite across a plurality of servers. An exemplary execution of such technologies is shown in FIGS. 17A-B and 18A-B.

In the example, a server program suite having a plurality of server programs (e.g., such as that described in Example 1) is installed across a plurality of servers 1710A-N. At least one of the server programs is installed across two servers 1810A and 1810B as installed server subprograms 1890B, 1890C.

Figure 17A:
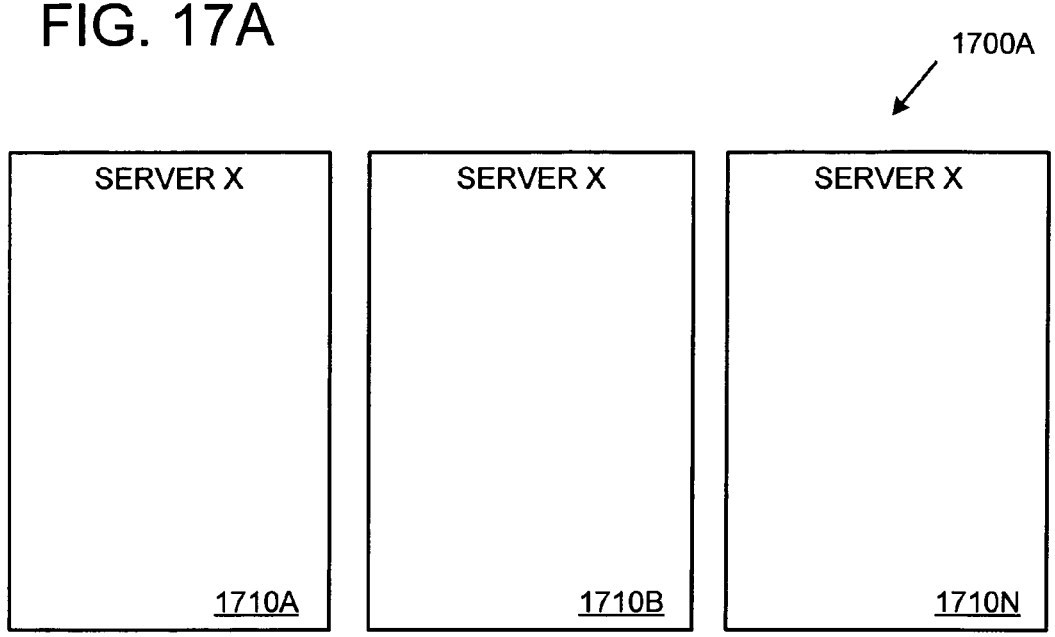
FIG. 17A is a block diagram showing exemplary unconfigured servers.

In FIG. 17A, the servers 1710A-1710N are unconfigured as shown in the phase 1700A. No installation utilities or server programs have yet been installed. Determination of which of the servers 1710A-1710N will be the primary server or Server 1 can be accomplished via any of the technologies described herein (e.g., by detecting which server at which installation begins, by choosing a server based on hardware configuration, or the like). Although not shown, the servers 1710A-1710N can have some software already installed, such as an operating system (e.g., a basic operating system that can support installation of an installation utility).

Figure 17B:
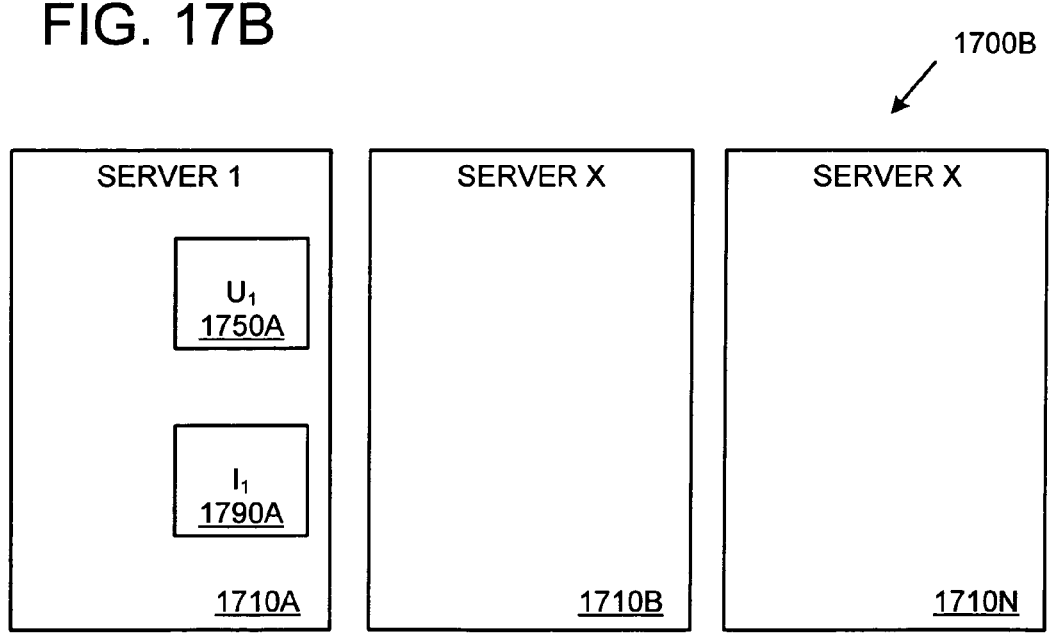
FIG. 17B is a block diagram showing exemplary installation at a first server.

In FIG. 17B, after another phase 1700B has been completed, an installation utility 1750A has already been installed at Server 1 1710A (e.g., which has been designated as Server 1 by the installation utility 1750A). The installation utility 1750A has proceeded to install a first server program 1790A.

Figure 18A:
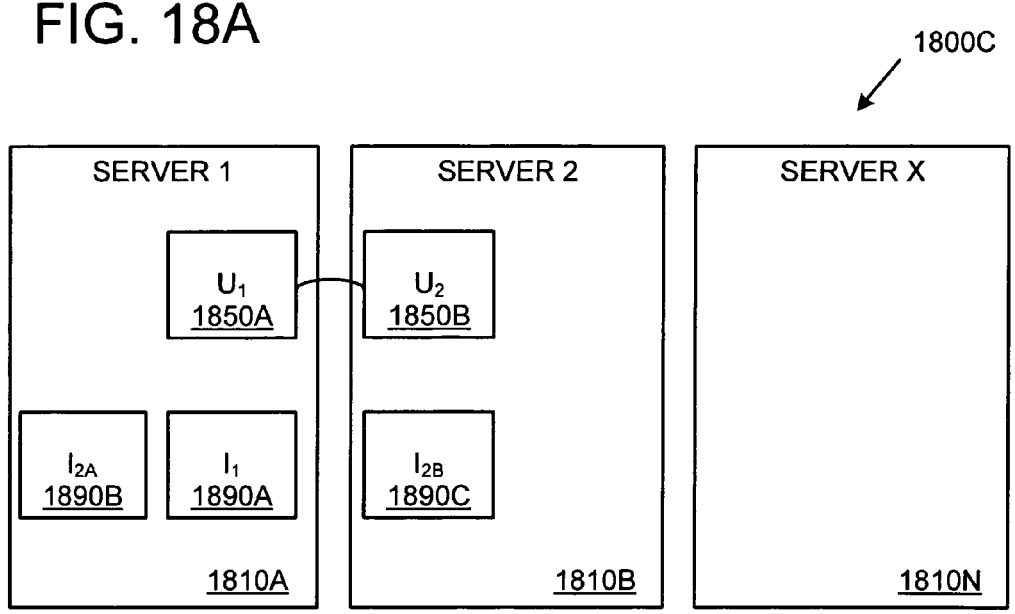
FIG. 18A is a block diagram showing exemplary installation at a second server.

In FIG. 18A, after another phase 1800C has been completed, another installation utility 1850B has been installed at Server 2 1810B. The installation utility 1850B can be customized for use on Server 2 1810B, or the installation utility 1850B can be the same as the other installation utility 1850A, but recognize that it is running on Server 2 1810B. Accordingly, the installation utility 1850B has installed the software appropriate for Server 2 1810B. In the example, a second part 1890C of a server program (e.g., a subprogram) has been installed at Server 2 1810B. The other part 1890B has been installed at Server 1 1810A.

The installation utilities 1850A, 1850B can communicate via any of the mechanisms described herein to collaboratively install the server programs across the plural server computers 1810A and 1810B.

Figure 18B:
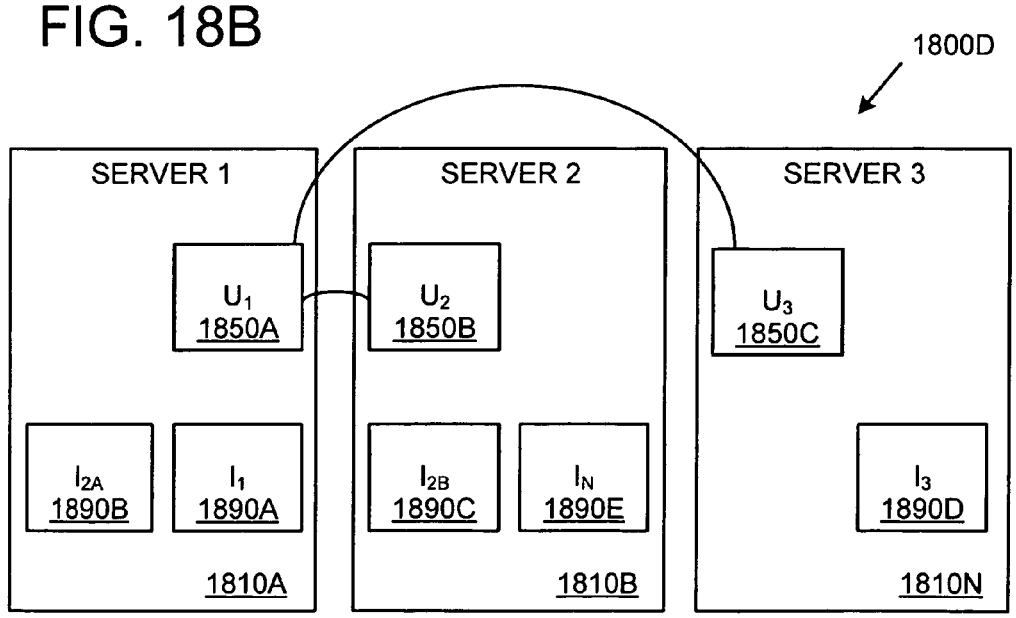
FIG. 18B is a block diagram showing exemplary installation at a third server.

In FIG. 18B, after another phase 1800D has been completed, yet another installation utility 1850C has been installed at Server 3 1810C.

The installation utility 1850C can be customized for use on Server 3 1810C, or the installation utility 1850C can be the same as the other installation utility 1850A, but recognize that it is running on Server 3 1810C. Accordingly, the installation utility 1850C has installed the software appropriate for Server 3 1810C. In the example, another server program 1890D has been installed at Server 3 1810C.

Meanwhile, another server program 1890E has been installed at Server 2 1810B.

The installation utilities 1850A, 1850B, 1890C can communicate via any of the mechanisms described herein to collaboratively install the server programs across the plural server computers 1810A-1810N.

As described herein, installation can take place by installing software programs having deployment neutral settings. Deployment specific settings can be collected at one of the Servers (e.g., Server 1 1810A) via a user interface and propagated to the other servers via a communication mechanism.

FIG. 19 shows an exemplary method 1900 by which the installation can take place. In the example, at 1910, one of the servers is designated as "Server 1" (e.g., by an installation utility). Other actions, such as installing server programs at Server 1 can then take place.

At 1920, another one of the servers (e.g., a different server) is designated as "Server 2." Other actions, such as installing server programs at Server 2 can then take place. An installation utility at Server 2 can communicate with an installation utility at Server 1. Thus, Server 2 can take advantage of information already collected at Server 1 from a user.

At 1930, the server programs (e.g., in a server program suite) can be collaboratively installed via communication between the servers (e.g., by installation utilities). For example, one or more other servers can be designated, and additional server programs can be installed.

Example 34

Exemplary Responsibilities

In any of the examples described herein, a computer server can have one or more responsibilities for providing computer services. For example, a computer server can have the responsibility of providing DHCP service. A computer server can also have other responsibilities, such as providing: directory service, data backup service, firewall service, antivirus service, anti-spam service, file sharing, Web service, and various networking services such as DNS.

A single computer server can have multiple responsibilities. A single responsibility can also be divided (e.g., distributed, split) across multiple computer servers in various ways (e.g., multiple servers can share a responsibility for providing a computer service). For example, a first (e.g., primary) server can be responsible for providing DHCP service. A second (e.g., secondary or backup) server can share responsibility for providing DHCP service with the first server. The first and second server can, for example, each provide DHCP service by splitting an IP address range (e.g., in half) and having each server operate its part of the range. In this way, if the first server stops responding, then the second server can still meet the responsibility to provide DHCP service.

An IP address range can also be split in other ways. For example, an IP address range can be split into a larger part and a smaller part. A primary server can be assigned the larger range, and a secondary server can be assigned the smaller range. If the primary server stops responding, then the secondary server can still provide some addresses (but not as many as the primary server). If the primary server stops responding, the secondary server can also recover (e.g., take over) the larger range from the primary server.

Dividing responsibility for a service among multiple servers can also provide redundancy. For example, two servers (e.g., of an integrated multi-server network or environment) can both be responsible for the same service. One of the servers can be a primary and the other a secondary. As long as the primary is responding, the primary can provide the service. If the primary fails to respond, the secondary can take over providing the service. For example, a first server can provide primary DHCP service. If the first server stops responding (e.g., crashes, is inoperable, or otherwise fails to respond to DHCP requests), then the secondary server can provide backup DHCP service. Similarly, a primary server can provide directory services (e.g., providing user account and password information for login purposes), and if it stops responding then a secondary server can take over providing directory services.

A computer server can also be responsible for providing a computer service that manages a resource. For example, a resource managed by a computer service can be a network resource (e.g., an IP address space managed by a DHCP service). The resource managed by the computer service can be split into multiple pieces (e.g., into a first part and a second part). The pieces can be mutually exclusive (e.g., an IP address space can be split into multiple non-overlapping IP address spaces). The pieces can be assigned to multiple servers (e.g., a first server can operate a DHCP service providing half of an IP address space, and a second server can operate a DHCP service providing the other half of the IP address space).

For example, an IP address space can be selected based on the size of a business or organization (e.g., the number of devices that need IP addresses). The IP address space can be selected to accommodate at least twice the number of devices so that if the IP address space is split in half, and each half is assigned to a different server, if one of the servers goes down the other can still provide enough IP address for all devices of the business or organization.

Example 35

Exemplary Servers Providing Services

Figure 20:
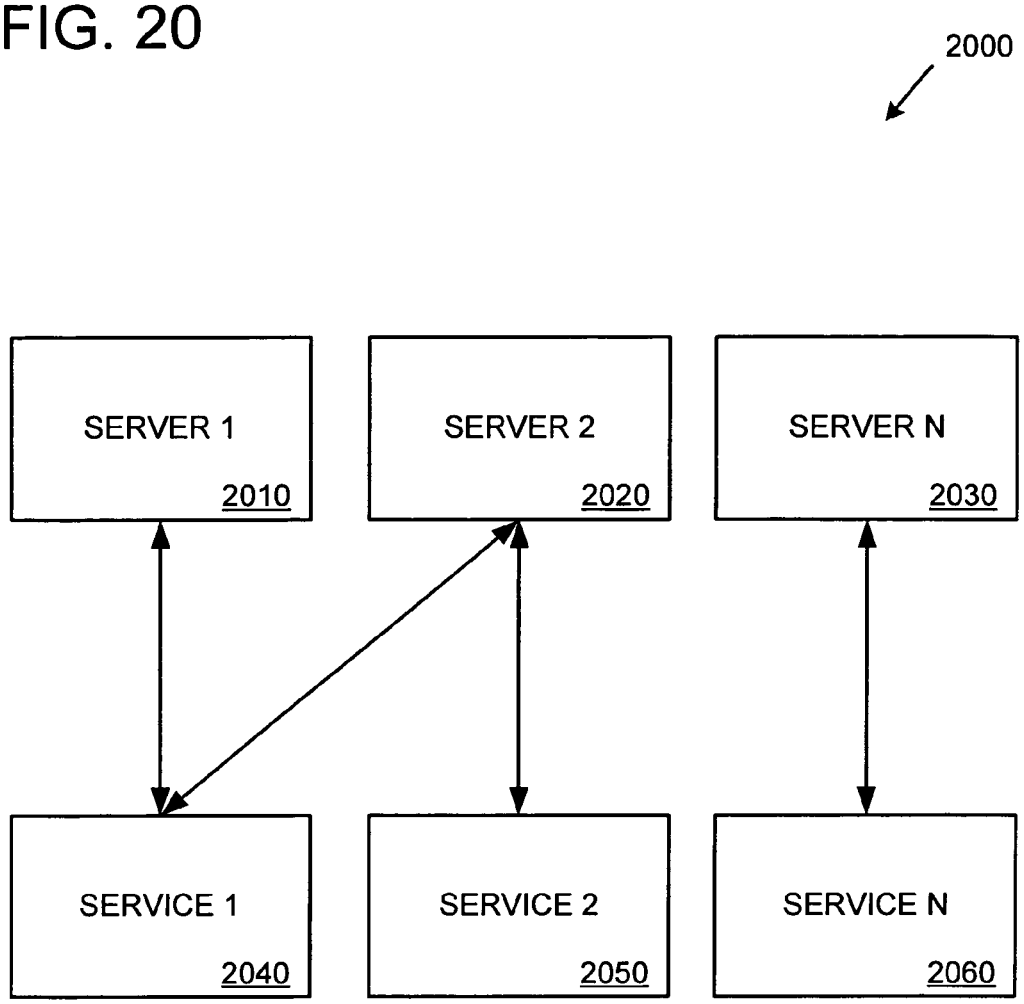
FIG. 20 is a block diagram showing an exemplary system of multiple servers configured to provide multiple services.

FIG. 20 shows an exemplary system 2000 of multiple servers configured to provide multiple services. A service (e.g., email service, networking service, data backup service) can be provided by a single server or multiple servers (e.g., can be split across multiple servers with the multiple servers having responsibility to provide the service). Similarly, a server can provide one or more services.

In the example, multiple servers 1-N (2010-2030) are configured to provide multiple services 1-N (2040-2060). In the example, a first server 2010 is configured to provide a first service 2040 (e.g., the first server 2010 is responsible for providing the first service 2040). A second server 2020 is configured to provide the first service 2040 and a second service 2050. Finally, a last server 2030 is configured to provide a last service 2060. For example, service 1 2040 can be a networking service (e.g., DHCP), service 2 2050 can be a data backup service, and service 3 2060 can be an email service.

Example 36

Exemplary Method for Automated Redundant Configuration of a Computer Service

Figure 21:
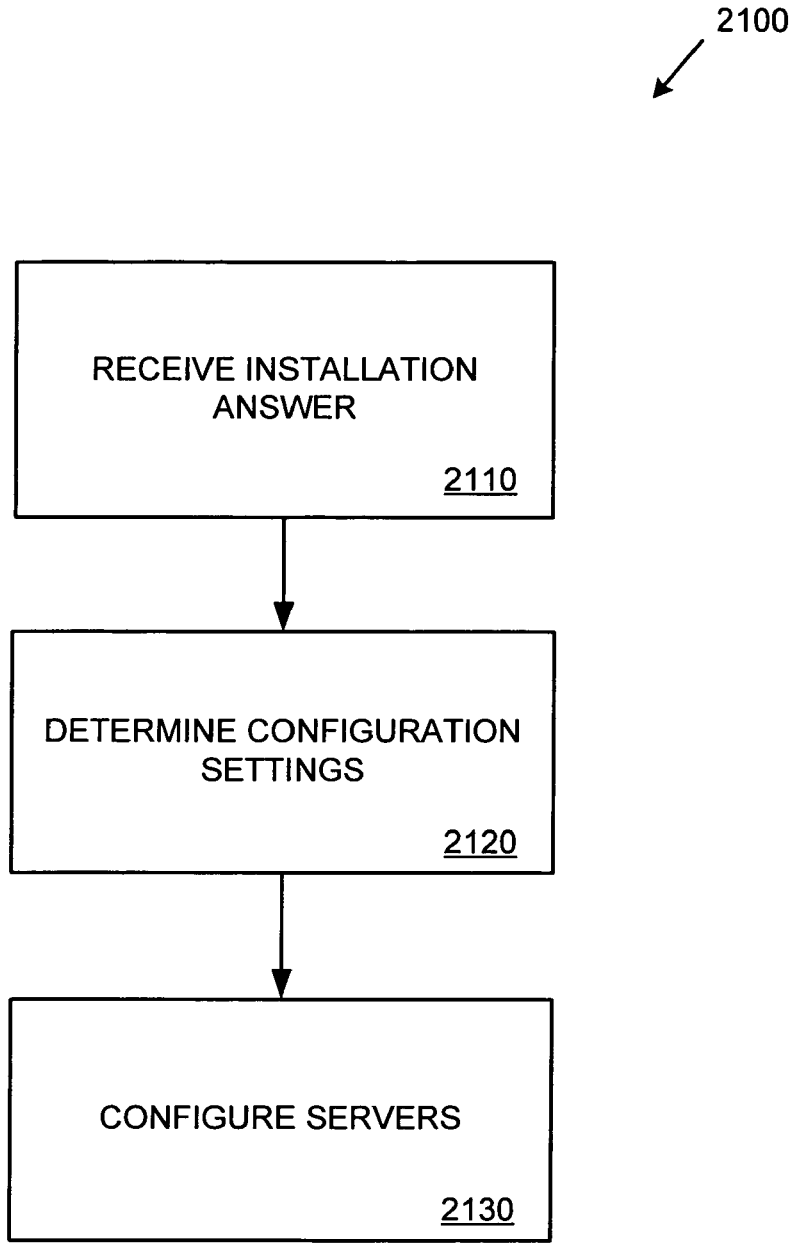
FIG. 21 is a flowchart showing an exemplary method for automated redundant configuration of a computer service.

FIG. 21 shows an exemplary method 2100 for automated redundant configuration of a computer service and can be performed, for example, by a system such as that shown in FIG. 7. At 2110, an installation answer is received regarding configuring a computer service. For example, the installation answer can be received from a user via a user interface that is displayed on a computer server. The installation answer can also be received from an automated discovery process (e.g., run on a computer server). For example, the automated discovery process can examine attributes of a server (e.g., which applications are installed) or a network (e.g., network address information).

At 2120, the installation answer is used to automatically determine configuration settings for the computer service to operate redundantly across multiple computer servers. For example, the installation answer can be used to determine configuration settings without any further involvement by the user. Determining the configuration settings can comprise dividing a responsibility to provide the computer service between a first and a second server (e.g., of an integrated multi-server network or environment) such that the servers provide redundancy (e.g., if one server fails to respond, the other server can still provide the service). For example, the responsibility can be to provide: data backup services, networking services, or directory services.

Automatically determining configuration settings can also comprise consulting an installation knowledge base based on the installation answer. For example, the installation knowledge base can contain answers to complex configuration problems (e.g., splitting network address space so that multiple computer servers can be correctly configured to provide DHCP service).

At 2130, the plurality of computer servers are configured, using the configuration settings, to provide the computer service. For example, a first server can be configured to be a primary server for the service (e.g., to provide the service exclusively while the server is operating, or to provide the service cooperatively along with a different server). A second server can be configured to be a secondary or backup server for the service (e.g., to provide the service only when the primary server is not operating, or to provide the service cooperatively with the primary server).

Example 37

Figure 22:
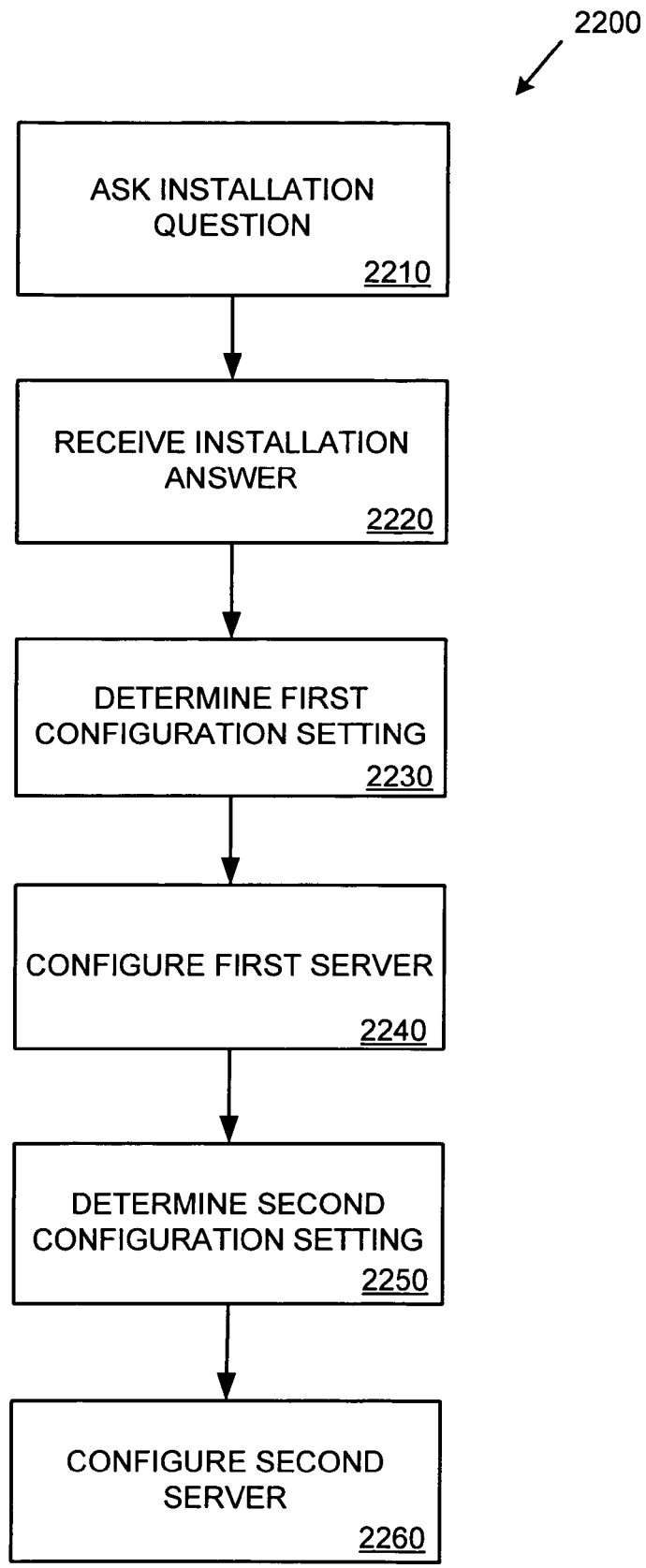
FIG. 22 is a flowchart showing an exemplary method for automated redundant configuration of a plurality of computer servers to provide a computer service.

Exemplary Method for Automated Redundant Configuration of a Plurality of Computer Servers FIG. 22 shows an exemplary method 2200 for automated redundant configuration of a plurality of computer servers to provide a computer service, and can be performed, for example, by a system such as that shown in FIG. 7. At 2210, an installation question is asked of a user configuring a plurality of computer servers. For example, the user can be asked an installation question regarding configuring a data backup service. At 2220, an installation answer is received from the user (e.g., via a user interface) in response to the installation question. At 2230, based on the installation answer, a first configuration setting is determined to configure a first server to provide the computer service. At 2240, the first server is configured with the first configuration setting.

For example, a user configuring a data backup service can be asked about how to configure the data backup service. The user can be asked about dividing the data backup service responsibility among multiple computer servers (e.g., which storage devices on a network to backup using which computer servers). Based on the user's answer, a first server can be configured to provide data backup service for a specific storage device (e.g., a hard drive array located on a different server).

At 2250, based on the installation answer, a second configuration setting is determined to configure a second server to provide the computer service. At 2260, the second server is configured with the second configuration setting.

For example, using the data backup service example, a second server can be configured to provide data backup service for the same storage device, or for a different storage device. In this way, data backup service can be divided or split between multiple computer servers (e.g., each computer server responsible for backing up specific storage devices).

Example 38

Exemplary Computing Environment

Figure 23:
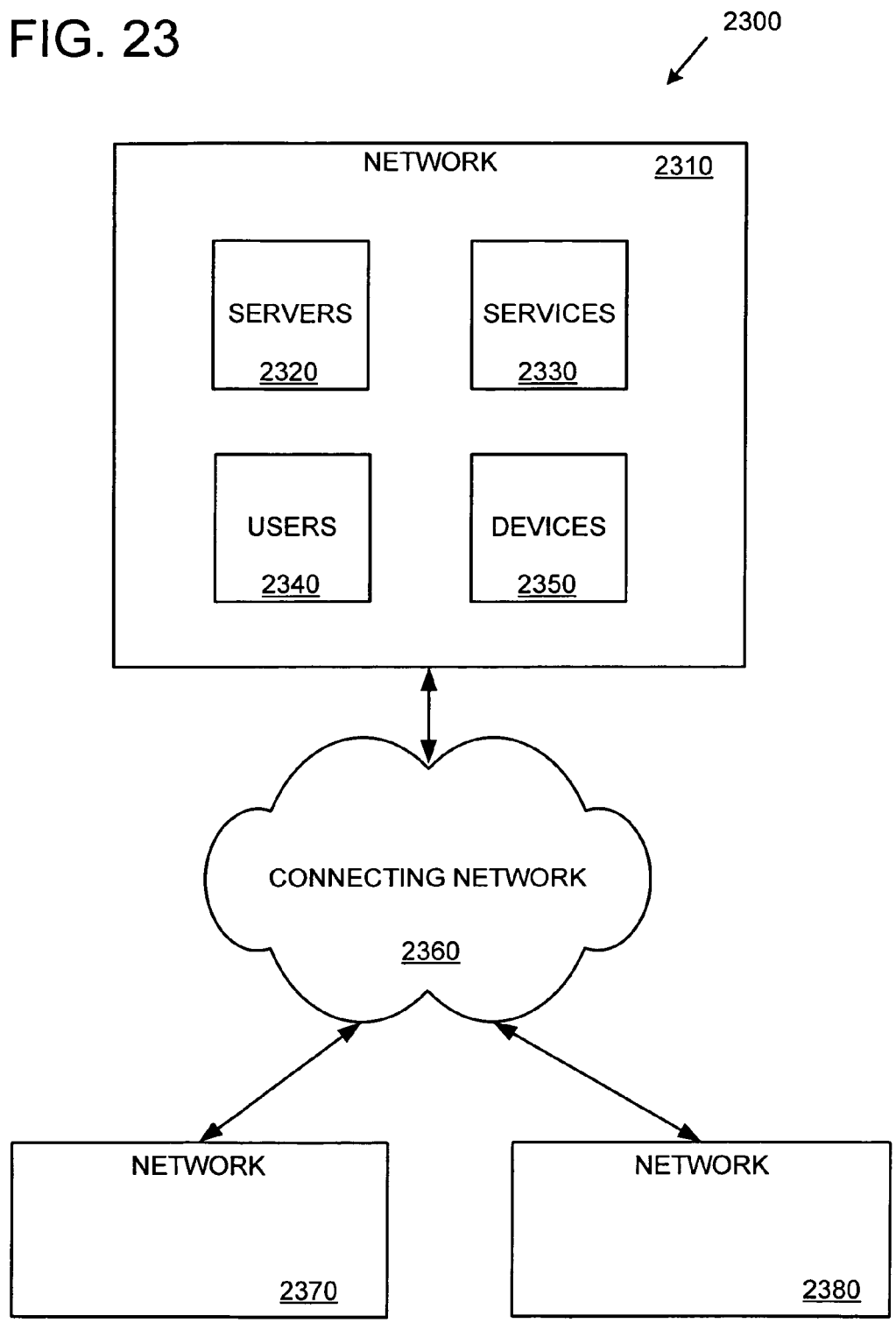
FIG. 23 is a block diagram illustrating an example of a computing environment that can be used to implement any of the technologies described herein.

FIG. 23 illustrates an example computing environment 2300 that can be used to implement any of the technologies described herein. The computing environment includes a network 2310. The network 2310 can comprise servers 2320 (e.g., computer servers), services 2330 (e.g., computer services), users 2340 (e.g., general computer users, IT administrators, employees), and devices 2350 (e.g., desktop or laptop computers, printers, copiers, scanners).

The network 2310 can connect to other networks, such as 2370 and 2380 through in connecting network 2360. For example, the connecting network 2360 can comprise a wide area network such as the Internet or a local network. The connecting network can comprise various network hardware, protocols, and topologies.

Example 39

Exemplary General Purpose Computer System

Figure 24:
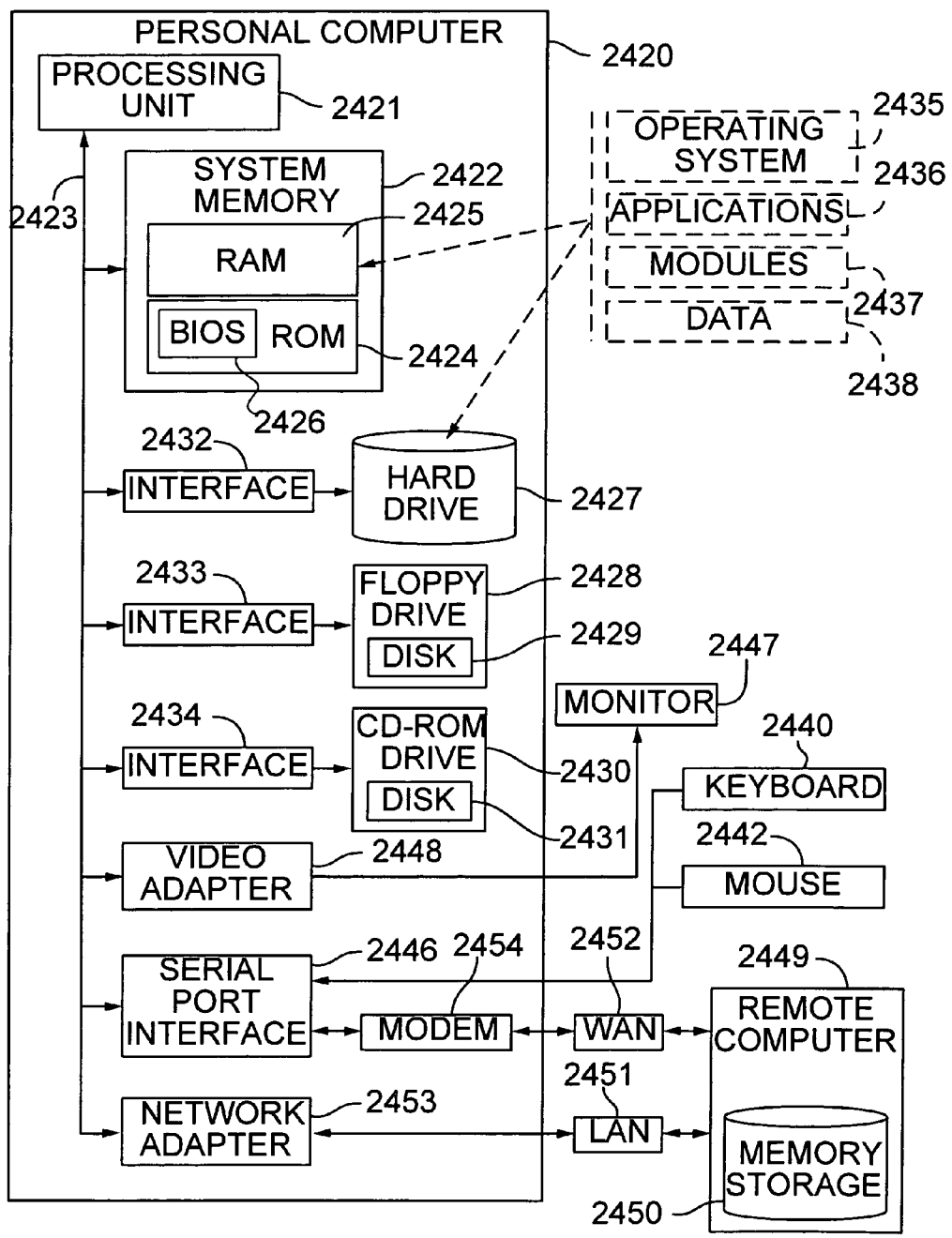
FIG. 24 is block diagram illustrating an example of a computer system that can be used to implement any of the technologies described herein.

FIG. 24 illustrates an example of a computer system 2400 that can be used to implement any of the technologies described herein. The computer system includes a personal computer 2420, including a processing unit 2421, a system memory 2422, and a system bus 2427 that interconnects various system components including the system memory to the processing unit 2421. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 2424 and random access memory (RAM) 2425. A basic input/output system 2426 (BIOS), containing the basic routines that help to transfer information between elements within the personal computer 2420, such as during start-up, is stored in ROM 2424. The personal computer 2420 further includes a hard disk drive 2427, a magnetic disk drive 2428, e.g., to read from or write to a removable disk 2429, and an optical disk drive 2470, e.g., for reading a CD-ROM disk 2471 or to read from or write to other optical media. The hard disk drive 2427, magnetic disk drive 2428, and optical disk drive 2470 are connected to the system bus 2427 by a hard disk drive interface 2472, a magnetic disk drive interface 2477, and an optical drive interface 2474, respectively. The drives and their associated computer-readable media provide nonvolatile storage of data, data structures, computer-executable instructions (program code such as dynamic link libraries, and executable files), etc. for the personal computer 2420. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 2425, including an operating system 2475, one or more application programs 2476, other program modules 2477, and program data 2478. A user may enter commands and information into the personal computer 2420 through a keyboard 2440 and pointing device, such as a mouse 2442. Other input devices (not shown) may include a microphone, joystick, game pad, satellite dish, scanner, or the like. These and other input devices are often connected to the processing unit 2421 through a serial port interface 2449 that is coupled to the system bus, but may be connected by other interfaces, such as a parallel port, game port or a universal serial bus (USB). A monitor 2447 or other type of display device is also connected to the system bus 2427 via an interface, such as a display controller or video adapter 2448. In addition to the monitor, personal computers typically include other peripheral output devices (not shown), such as speakers and printers.

The personal computer 2420 may operate in a networked environment using logical connections to one or more remote computers, such as a remote computer 2449. The remote computer 2449 may be a server, a router, a peer device or other common network node, and typically includes many or all of the elements described relative to the personal computer 2420, although only a memory storage device 2450 has been illustrated in FIG. 24. The logical connections depicted in FIG. 24 include a local area network (LAN) 2451 and a wide area network (WAN) 2452. Such networking environments are commonplace in offices, enterprise-wide computer networks, intranets and the Internet.

When used in a LAN networking environment, the personal computer 2420 is connected to the local network 2451 through a network interface or adapter 2457. When used in a WAN networking environment, the personal computer 2420 typically includes a modem 2454 or other means for establishing communications over the wide area network 2452, such as the Internet. The modem 2454, which may be internal or external, is connected to the system bus 2427 via the serial port interface 2446. In a networked environment, program modules depicted relative to the personal computer 2420, or portions thereof, may be stored in the remote memory storage device. The network connections shown are merely examples and other means of establishing a communications link between the computers may be used.

Example 40

Exemplary Automated Methods

Any of the methods described herein can be performed via one or more computer-readable media having computer-executable instructions for performing such methods. Operation can be fully automatic, semi-automatic, or involve manual intervention.

Example 41

Exemplary Combinations

The technologies of any example described herein can be combined with the technologies of any one or more other examples described herein.

Example 42

Exemplary Alternatives

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for installing a plurality of computer servers for integrated operation using a plurality of computer server installation images, the method comprising:
   receiving a first computer server installation image, wherein the first computer server installation image comprises a first operating system and a first application, wherein the operating system and the first application are configured with deployment neutral settings, and wherein the first computer server installation image is configured for providing first services on a first server in an integrated multi-server environment comprising the first server and a second server of the plurality of computer servers;
   receiving a second computer server installation image, wherein the second computer server installation image comprises a second operating system and a second application, wherein the second operating system and the second application are configured with deployment neutral settings, and wherein the second computer server installation image is configured for providing second services on the second server in the integrated multi-server environment comprising the first server and the second server of the plurality of computer servers;
   wherein the first services and second services are different;
   consulting a knowledge base having installation answers for the first server of the plurality of computer servers and for the second server of the plurality of computer servers;
   based on installation answers provided by the knowledge base, installing the first operating system and the first application from the first computer server installation image on the first server, wherein the first server is configured for providing the first services in the integrated multi-server environment;
   based on installation answers provided by the knowledge base, installing the second operating system and the second application from the second computer server installation image on the second server, wherein the second server is configured for providing the second services in the integrated multi-server environment;
   customizing the first server, wherein customizing the first server comprises configuring the first operating system and the first application of the first server with first deployment specific settings; and
   customizing the second server, wherein customizing the second server comprises automatically configuring the second operating system and the second application of the second server with second deployment specific settings without user's input, and wherein the second deployment specific settings are different from the first deployment specific settings.

2. The method of claim 1 wherein configuring the second operating system on the second server with the second deployment specific settings comprises receiving, from the first server over a network, the second deployment specific settings for configuring the second operating system on the second server.

3. The method of claim 1 wherein customizing the first application on the first server comprises:
   presenting a user interface to a user configuring the first application; and
   receiving the first deployment specific settings for configuring the first application from the user via the user interface.

4. The method of claim 1 wherein the first application installed on the first server provides networking services.

5. The method of claim 1 wherein the second application installed on the second server provides email services.

6. The method of claim 1 further comprising:
   installing a third server of the plurality of computer servers with a third computer server installation image, wherein the third computer server installation image further comprises a third operating system and a third application, wherein the third operating system and the third application have been configured with deployment neutral settings;
   installing the third operating system and the third application on the third server from the third computer server installation image; and
   customizing the third server, wherein customizing the third server comprises configuring the third operating system and the third application of the third server with third deployment specific settings;
   wherein the first server is operable to provide a networking service, wherein the second server is operable to provide an email service, and wherein the third server is operable to provide a firewall service.

7. The method of claim 1 further comprising:
   after configuring the first application on the first server with first deployment specific settings, migrating settings and data from a legacy server to the first application on the first server.

8. The method of claim 1 wherein a hardware configuration of the first server is different from a hardware configuration of the second server.

9. A method for creating a plurality of computer server installation images, the method comprising:
   installing a first application on a first source computer server, wherein installing the first application comprises genericizing the first application, and wherein genericizing the first application comprises replacing deployment specific settings with deployment neutral settings;
   installing a second application on the first source computer server, wherein installing the second application comprises genericizing the second application, and wherein genericizing the second application comprises replacing deployment specific settings with deployment neutral settings;
   installing a first operating system on the first source computer server, wherein installing the first operating system comprises genericizing the first operating system, and wherein genericizing the first operating system comprises replacing deployment specific settings with deployment neutral settings;
   after installing the first application, the second application, and the first operating system on the first source computer server, configuring the first source computer server to provide first services in an integrated environment with a second source computer server and creating a first computer server installation image by imaging the first source computer server, wherein the first computer server installation image is configured with deployment neutral settings and is customizable upon installation;
   installing the second application on a second source computer server, wherein installing the second application comprises genericizing the second application, and wherein genericizing the second application comprises replacing deployment specific settings with deployment neutral settings;

installing a third application on the second source computer server, wherein installing the third application comprises genericizing the third application, and wherein genericizing the third application comprises replacing deployment specific settings with deployment neutral settings;

installing a second operating system on the second source computer server, wherein installing the second operating system comprises genericizing the second operating system, and wherein genericizing the second operating system comprises replacing deployment specific settings with deployment neutral settings;

after installing the second application, the third application, and the second operating system on the second source computer server, configuring the second source computer server to provide second services in an integrated environment with the first source computer server and creating a second computer server installation image by imaging the second source computer server, wherein the second computer server installation image is configured with deployment neutral settings and is customizable upon installation; and transferring the first computer server installation image comprising deployment neutral settings to at least a first server in an integrated-multi-server environment and transferring the second computer server installation image comprising deployment neutral settings to at least a second server in the integrated-multi-server environment;

wherein the first computer server installation image and the second computer server installation image are different, wherein the first computer server installation image is configured for providing the first services on the first server and the second computer installation image is configured for providing the second services on the second server as part of a plurality of integrated computer server installation images, wherein the first services and the second services are different, wherein the plurality of integrated computer server installation images are operable to install the integrated-multi-server environment, and wherein the plurality of integrated computer server installation images are customizable upon installation for at least the first server and the second server in the integrated-multi-server environment.

10. The method of claim 9 wherein the first computer server installation image is a single image comprising the first operating system, the first application, and the second application.

11. The method of claim 9 wherein configuring the first operating system with deployment neutral settings comprises configuring the first operating system with settings that are optimized for a multi-server environment, and wherein configuring the first application and the second application with deployment neutral settings comprises configuring the first application and the second application with settings that are optimized for the multi-server environment.

12. The method of claim 9 wherein genericizing the first application further comprises replacing a deployment specific setting of a specific static IP address mode with a deployment neutral setting of a dynamically assigned IP address mode.

13. The method of claim 9 wherein genericizing the first computer server installation image comprises removing at least one unique server identification value.

14. The method of claim 9 further comprising: before creating the first computer server installation image, installing one or more additional applications on the first source computer server, wherein installing the one or more additional applications comprises genericizing the one or more additional applications by replacing deployment specific settings with deployment neutral settings.

15. The method of claim 9 wherein installing the first application comprises installing less than all of a plurality of components comprising the first application.

16. A non-transitory computer readable storage media storing a plurality of computer server installation images, the computer readable storage media also storing computer-executable instructions for installing a plurality of computer servers for integrated operation using the plurality of computer server installation images, the computer-executable instructions performing a computer implemented method comprising:
receiving a first computer server installation image, wherein the first computer server installation image comprises a first operating system and a first application, wherein the first operating system and the first application are configured with deployment neutral settings, and wherein the first computer server installation image is configured for providing first services on a first server in an integrated multi-server environment comprising the first server and a second server of the plurality of computer servers;

receiving a second computer server installation image, wherein the second computer server installation image further comprises a second operating system and a second application, wherein the second operating system and the second application have been are configured with deployment neutral settings, and wherein the second computer server installation image is configured for providing second services on the second server in the integrated multi-server environment comprising the first server and the second server of the plurality of computer servers;

consulting a knowledge base having installation answers for the first server of the plurality of computer servers and for the second server of the plurality of computer servers;

based on installation answers provided by the knowledge base, installing the first operating system and the first application on the first server from the first computer server installation image, wherein the first server is configured for providing the first services in the integrated multi-server environment;

based on installation answers provided by the knowledge base, installing the second operating system and the second application on the second server from the second computer server installation image, wherein the second server is configured for providing the second services in the integrated multi-server environment, wherein the first services and second services are different;

customizing the first server, wherein customizing the first server comprises configuring the first operating system and the first application with first deployment specific settings; and customizing the second server, wherein customizing the second server further comprises automatically configuring the second operating system and the second application with second deployment specific settings without user's input, and wherein the second deployment specific settings are different from the first deployment specific settings.

* * * * *